(12) United States Patent
Pain et al.

(10) Patent No.: US 12,104,264 B2
(45) Date of Patent: Oct. 1, 2024

(54) SYSTEMS AND METHODS FOR ELECTROCHEMICAL ADDITIVE MANUFACTURING OF PARTS USING CAPACITIVE SENSING

(71) Applicant: FABRIC8LABS, INC., San Diego, CA (US)

(72) Inventors: David Pain, Carlsbad, CA (US); Andrew Edmonds, Oceanside, CA (US); Jeffrey Herman, Solana Beach, CA (US); Charles Pateros, Carlsbad, CA (US); Ryan Nicholl, San Diego, CA (US); Kareemullah Shaik, San Diego, CA (US)

(73) Assignee: FABRIC8LABS, INC., San Diego, CA (US)

( * ) Notice: Subject to any disclaimer, the term of this patent is extended or adjusted under 35 U.S.C. 154(b) by 285 days.

(21) Appl. No.: 17/554,677

(22) Filed: Dec. 17, 2021

(65) Prior Publication Data

US 2023/0193494 A1 Jun. 22, 2023

(51) Int. Cl.
*C25D 1/00* (2006.01)
*B33Y 10/00* (2015.01)
*B33Y 30/00* (2015.01)
*B33Y 50/02* (2015.01)

(52) U.S. Cl.
CPC ............. *C25D 1/003* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 4,575,330 A | 3/1986 | Hull |
| 4,678,282 A | 7/1987 | Yaniv et al. |
| 5,132,820 A | 6/1992 | Someya et al. |

(Continued)

FOREIGN PATENT DOCUMENTS

| CN | 104178782 | 12/2014 |
| CN | 204097583 | 1/2015 |

(Continued)

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.

(Continued)

*Primary Examiner* — Louis J Rufo
(74) *Attorney, Agent, or Firm* — Kunzler Bean & Adamson

(57) ABSTRACT

An electrochemical deposition system includes a cathode and a printhead. The printhead is spaced apart from the cathode, movable relative to the cathode, and comprises a plurality of deposition anodes. The system further comprises a capacitive sensor that includes a first electrically-conductive layer, at a known location relative to the cathode, and a second electrically-conductive layer, at a known location relative to the printhead. The system additionally includes a processor, electrically coupled with the capacitive sensor and configured to determine a distance between the cathode and the printhead in response to a capacitance of the capacitive sensor.

21 Claims, 16 Drawing Sheets

(56) References Cited

U.S. PATENT DOCUMENTS

| | | |
|---|---|---|
| 5,403,460 A | 4/1995 | Sala et al. |
| 5,641,391 A | 6/1997 | Hunter et al. |
| 5,998,805 A | 12/1999 | Shi et al. |
| 6,036,834 A | 3/2000 | Clerc |
| 7,839,831 B2 | 11/2010 | Vrcelj et al. |
| 8,168,540 B1 | 5/2012 | Reid et al. |
| 8,681,077 B2 | 3/2014 | Kimura |
| 9,777,385 B2 | 10/2017 | Wirth et al. |
| 10,465,307 B2 | 11/2019 | Pain et al. |
| 10,724,146 B1 | 7/2020 | Pain et al. |
| 10,914,000 B1 | 2/2021 | Pain et al. |
| 10,947,632 B1 | 3/2021 | Pain et al. |
| 11,232,956 B2 | 1/2022 | Pain et al. |
| 11,313,035 B2 | 4/2022 | Pain et al. |
| 11,313,036 B2 | 4/2022 | Pain et al. |
| 2001/0014409 A1 | 8/2001 | Cohen |
| 2003/0006133 A1 | 1/2003 | Metzger |
| 2004/0129573 A1 | 7/2004 | Cohen |
| 2005/0045252 A1 | 3/2005 | Yamasaki et al. |
| 2005/0176238 A1 | 8/2005 | Cohen et al. |
| 2005/0183959 A1 | 8/2005 | Wilson et al. |
| 2005/0202660 A1 | 9/2005 | Cohen et al. |
| 2005/0223543 A1 | 10/2005 | Cohen et al. |
| 2006/0283539 A1 | 12/2006 | Slafer |
| 2007/0068819 A1 | 3/2007 | Singh et al. |
| 2007/0089993 A1 | 4/2007 | Schwartz et al. |
| 2007/0221504 A1 | 9/2007 | Yuefeng |
| 2010/0300886 A1 | 12/2010 | Lin et al. |
| 2011/0210005 A1 | 9/2011 | Van Den Bossche et al. |
| 2017/0145584 A1 | 5/2017 | Wirth et al. |
| 2019/0160594 A1 | 5/2019 | Flamm et al. |
| 2021/0047744 A1 | 2/2021 | Biton |
| 2024/0084473 A1* | 3/2024 | Mayer .................... C25D 21/12 |

FOREIGN PATENT DOCUMENTS

| | | |
|---|---|---|
| CN | 104593830 | 5/2015 |
| WO | 2017087884 | 5/2017 |
| WO | 2019150362 | 8/2019 |
| WO | 2021041265 | 3/2021 |

OTHER PUBLICATIONS

Stewart et al., "Polysilicon TFT Technology for Active Matrix OLED Displays", IEEE Transactions on Electron Devices, May 2001, pp. 845-851, vol. 48, No. 5.

International Search Report and Written Opinion for PCT/US2020/047531 dated Sep. 29, 2020.

Supplementary International Search Report for PCT/US2020/047531 dated Nov. 22, 2021.

U.S. Appl. No. 17/554,677, filed Dec. 17, 2021.

U.S. Appl. No. 17/566,546, filed Dec. 30, 2021.

U.S. Appl. No. 17/535,437, filed Nov. 24, 2021.

U.S. Appl. No. 17/099,602, filed Nov. 16, 2020.

* cited by examiner

SYSTEMS AND METHODS FOR ELECTROCHEMICAL ADDITIVE MANUFACTURING OF PARTS USING CAPACITIVE SENSING

FIELD

This disclosure relates generally to manufacturing parts, and more particularly to systems and methods for manufacturing parts using electrochemical additive manufacturing techniques.

BACKGROUND

Electrochemical additive manufacturing utilizes electrochemical reactions to manufacture parts in an additive manufacturing manner. In an electrochemical additive manufacturing process, a metal part is constructed by plating charged metal ions onto a surface in an electrolyte solution. This technique relies on placing a deposition anode physically close to a substrate in the presence of a deposition solution (the electrolyte), and energizing the anode causing charge to flow through the anode. This creates an electrochemical reduction reaction to occur at the substrate near the anode and deposition of material on the substrate. Although electrochemical additive manufacturing techniques provide distinct advantages over other types of additive manufacturing processes, such as selective laser melting and electron beam melting, properly locating the deposition anode and the substrate, relative to each other, to efficiently and accurately produce a part can be difficult.

SUMMARY

The subject matter of the present application has been developed in response to the present state of the art, and in particular, in response to the shortcomings of conventional systems and methods for additive manufacturing of parts, that have not yet been fully solved by currently available techniques. Accordingly, the subject matter of the present application has been developed to provide systems and methods for the electrochemical additive manufacturing of parts that overcome at least some of the above-discussed shortcomings of prior art techniques.

The following is a non-exhaustive list of examples, which may or may not be claimed, of the subject matter, disclosed herein.

Disclosed herein is an electrochemical deposition system that comprises a cathode and a printhead. The printhead is spaced apart from the cathode, movable relative to the cathode, and comprises a plurality of deposition anodes. The system further comprises a capacitive sensor comprising a first electrically-conductive layer, at a known location relative to the cathode, and a second electrically-conductive layer, at a known location relative to the printhead. The system additionally comprises a processor, electrically coupled with the capacitive sensor and configured to determine a distance between the cathode and the printhead in response to a capacitance of the capacitive sensor. The preceding subject matter of this paragraph characterizes example 1 of the present disclosure.

The electrochemical deposition system further comprises a seed layer applied onto the cathode. The first electrically-conductive layer of the capacitive sensor comprises the seed layer. The preceding subject matter of this paragraph characterizes example 2 of the present disclosure, wherein example 2 also includes the subject matter according to example 1, above.

The second electrically-conductive layer of the capacitive sensor comprises a metal layer separate from the plurality of deposition anodes. The preceding subject matter of this paragraph characterizes example 3 of the present disclosure, wherein example 3 also includes the subject matter according to example 2, above.

The printhead further comprises an insulation layer. The metal layer is embedded within the printhead such that the insulation layer is interposed between the metal layer and the plurality of deposition anodes. The preceding subject matter of this paragraph characterizes example 4 of the present disclosure, wherein example 4 also includes the subject matter according to example 3, above. The second electrically-conductive layer of the capacitive sensor comprises at least one of the plurality of deposition anodes. The preceding subject matter of this paragraph characterizes example 5 of the present disclosure, wherein example 5 also includes the subject matter according to any one of examples 2-4, above.

The second electrically-conductive layer of the capacitive sensor comprises at least two deposition anodes of the plurality of deposition anodes. The preceding subject matter of this paragraph characterizes example 6 of the present disclosure, wherein example 6 also includes the subject matter according to example 5, above.

The electrochemical deposition system further comprises a plurality of capacitive sensors. Each one of the plurality of capacitive sensors comprises the first electrically-conductive layer and a corresponding one of a plurality of second electrically-conductive layers. The second electrically-conductive layer of each one of the plurality of capacitive sensors is spaced apart from the second electrically-conductive layer of any other one of the plurality of capacitive sensors. The preceding subject matter of this paragraph characterizes example 7 of the present disclosure, wherein example 7 also includes the subject matter according to any one of examples 1-6, above.

The printhead comprises an outer peripheral edge. At least some of the plurality of second electrically-conductive layers are spaced apart along the outer peripheral edge of the printhead. The preceding subject matter of this paragraph characterizes example 8 of the present disclosure, wherein example 8 also includes the subject matter according to example 7, above.

The outer peripheral edge of the printhead defines at least three corners of the printhead. Each one of the at least some of the plurality of second electrically-conductive layers is located proximate a corresponding one of the four corners of the printhead. The preceding subject matter of this paragraph characterizes example 9 of the present disclosure, wherein example 9 also includes the subject matter according to example 8, above.

One of the plurality of second electrically-conductive layers is located at a center of the printhead. The preceding subject matter of this paragraph characterizes example 10 of the present disclosure, wherein example 10 also includes the subject matter according to example 9, above.

The second electrically-conductive layer of at least one of the plurality of capacitive sensors comprises a metal layer separate from the plurality of deposition anode. The second electrically-conductive layer of at least one of the plurality of capacitive sensors comprises at least one of the plurality of deposition anodes. The preceding subject matter of this paragraph characterizes example 11 of the present disclosure, wherein example 11 also includes the subject matter according to any one of examples 7-10, above.

The plurality of deposition anodes surround the metal layer such that no deposition anodes of the plurality of deposition anodes is interposed between the metal layer and the first electrically-conductive layer. The preceding subject matter of this paragraph characterizes example 12 of the present disclosure, wherein example 12 also includes the subject matter according to example 11, above.

The second electrically-conductive layer of each one of at least two of the plurality of capacitive sensors comprises a corresponding one of at least two groupings of the plurality of deposition anodes. The preceding subject matter of this paragraph characterizes example 13 of the present disclosure, wherein example 13 also includes the subject matter according to any one of examples 7-12, above.

At least one of the first electrically-conductive layer is fixed to the cathode such that the first electrically-conductive layer co-moves with the cathode, or the second electrically-conductive layer is fixed to the printhead such that the second electrically-conductive layer co-moves with the printhead.

Further disclosed herein is a method of electrochemically forming a part. The method comprises a step of determining a capacitance of a capacitive sensor, comprising a first electrically-conductive layer, at a known location relative to a cathode such that the first electrically-conductive layer co-moves with the cathode, and a second electrically-conductive layer, at a known location relative to a printhead, comprising a plurality of deposition anodes, such that the second electrically-conductive layer co-moves with the printhead. The method also comprises a step of determining a distance between the first electrically-conductive layer and the second electrically-conductive layer in response to the capacitance of the capacitive sensor. The method further comprises a step of determining at least one of a position, orientation, or planarity of the cathode and the printhead, relative to each other, in response to the distance between the first-electrically-conductive layer and the second electrically-conductive layer. The method additionally comprises a step of adjusting at least one of the position, orientation, or planarity of at least one of the cathode and the printhead, relative to each other, in response to a corresponding one of the position, orientation, or planarity of the cathode relative to the printhead being outside of a threshold. The method also comprises a step of electrochemically forming a layer of material onto the cathode. The preceding subject matter of this paragraph characterizes example 15 of the present disclosure.

The method further comprises a step of measuring a voltage response between the first electrically-conductive layer and the second electrically-conductive layer. The capacitance of the capacitance sensor is determined in response to the voltage response measured between the first electrically-conductive layer and the second electrically-conductive layer. The preceding subject matter of this paragraph characterizes example 16 of the present disclosure, wherein example 16 also includes the subject matter according to example 15, above.

The method further comprises steps of at least partially submerging the cathode and the printhead in a fluidic dielectric. The capacitance of the capacitive sensor is determined when the cathode and the printhead are at least partially submerged in the fluidic dielectric. The method also comprises steps of replacing the fluidic dielectric with electrolyte solution such that the cathode and the printhead are at least partially submerged in the electrolyte solution.

The layer of material is electrochemically formed onto the cathode when the cathode and the printhead are submerged in the electrolyte solution. The preceding subject matter of this paragraph characterizes example 17 of the present disclosure, wherein example 17 also includes the subject matter according to any one of examples 15-16, above.

The step of determining the capacitance of the capacitive sensor comprises determining the capacitance of a plurality of capacitive sensors where the second electrically-conductive layers of the plurality of capacitive sensors are located around a periphery of the printhead. The step of adjusting at least one of the position, orientation, or planarity of at least one of the cathode and the printhead, relative to each other, comprises adjusting a tilt of at least one of the cathode and the printhead, relative to each other. The preceding subject matter of this paragraph characterizes example 18 of the present disclosure, wherein example 18 also includes the subject matter according to any one of examples 15-17, above.

The second electrically-conductive layer of the capacitive sensor is located at a center of the printhead. The step of adjusting at least one of the position, orientation, or planarity of at least one of the cathode and the printhead, relative to each other, comprises adjusting a bow of at least one of the cathode and the printhead, relative to each other. The preceding subject matter of this paragraph characterizes example 19 of the present disclosure, wherein example 19 also includes the subject matter according to any one of examples 15-18, above.

The step of determining the capacitance of the capacitive sensor comprises determining the capacitance of a plurality of capacitive sensors where the second electrically-conductive layers of the plurality of capacitive sensors are located around a periphery of the printhead. The step of adjusting at least one of the position, orientation, or planarity of at least one of the cathode and the printhead, relative to each other, comprises adjusting a lateral position of at least one of the cathode and the printhead, relative to each other. The preceding subject matter of this paragraph characterizes example 20 of the present disclosure, wherein example 20 also includes the subject matter according to any one of examples 15-19, above.

The step of determining the capacitance of the capacitive sensor comprises determining the capacitance of a plurality of capacitive sensors where the second electrically-conductive layers of some of the plurality of capacitive sensors are located around a periphery of the printhead and where the second electrically-conductive layer of the capacitive sensor is located at a center of the printhead. The step of adjusting at least one of the position, orientation, or planarity of at least one of the cathode and the printhead, relative to each other, comprises adjusting a tilt of at least one of the cathode and the printhead, relative to each other, and adjusting a bow of at least one of the cathode and the printhead, relative to each other. The preceding subject matter of this paragraph characterizes example 21 of the present disclosure, wherein example 21 also includes the subject matter according to any one of examples 15-20, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are examples of an electrochemical deposition system and manufacturing process for constructing a metal part by reducing charged metal ions onto a surface in an electrolyte solution. Electrochemical deposition manufacturing includes placement of a printhead, including a deposition anode, physically close to a substrate in the presence of a deposition solution (e.g., an electrolyte), and energizing the anode, which causes an electrical charge to flow through the anode. The flow of the electrical charge through the anode creates an electrochemical reduction reaction to occur at the substrate, near the anode, which results in the deposition of material on the substrate. A proper position, orientation, and planarity of the printhead, relative to the substrate, promotes an accurate and complete deposition of material on the substrate. A particular challenge of electrochemical deposition manufacturing is ensuring the printhead has a proper planarity and is in a proper position and orientation for deposition of material onto the substrate. Additional challenges include difficulty in detecting fluid or bubbles in the deposited material, measuring the flow rate of material deposited onto the substrate, tracking a thickness and/or quality of deposited material. The electrochemical deposition system and manufacturing process of the present disclosure overcome at least one of these challenges by utilizing existing components to incorporate capacitive sensing capability into the system. Such capacitive sensing capability helps determine the position, orientation, and planarity of the printhead, relative to the substrate, in real-time, and enables detection of fluid or bubbles in the deposited material, measurement of the flow rate of material deposited onto the substrate, and tracking of the thickness and/or quality of deposited material, in real-time. This approach contrasts with typical open-loop additive manufacturing processes that rely on pre-set, absolute and precise machining and assembly tolerances to ensure a printhead is properly located relative to a substrate for depositing material onto the substrate.

Figure 1:
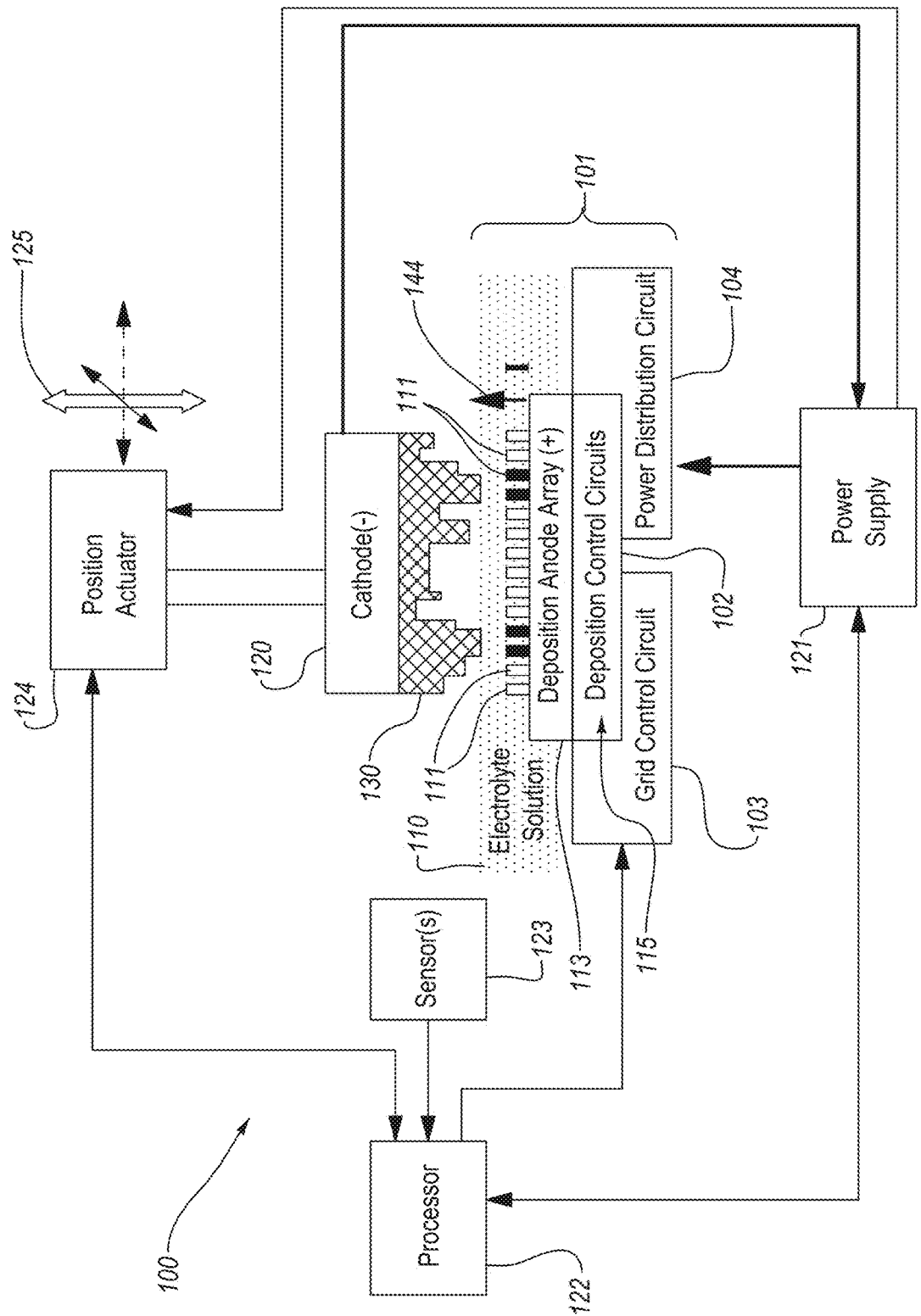
FIG. 1 is a schematic, elevation view of an electrochemical deposition system for manufacturing a part, according to one or more examples of the present disclosure.

Referring to FIG. 1, according to some examples, an electrochemical deposition system 100 includes a printhead 101 that contains at least one deposition anode 111. In certain examples, the printhead 101 contains a plurality of deposition anodes 111 arranged into a deposition anode array 113. The printhead 101 further includes at least one deposition control circuit corresponding with the deposition anode 111. In examples where the printhead 101 contains the deposition anode array 113, the printhead 101 includes a plurality of deposition control circuits 115 where at least one of the deposition control circuits 115 corresponds with each one of the deposition anodes 111 of the deposition anode array 113. The deposition control circuits 115 are organized into a matrix arrangement, in some examples, thereby supporting a high resolution of deposition anodes 111. The deposition anodes 111 of the deposition anode array 113 are arranged to form a two-dimensional grid in some examples. In FIG. 1, one dimension of the grid is shown with the other dimension of the grid going into and/or coming out of the page.

The printhead 101 further includes a grid control circuit 103 that transmits control signals to the deposition control circuits 115 to control the amount of electrical current flowing through each one of the deposition anodes 111 of the deposition anode array 113. The printhead 101 additionally includes a power distribution circuit 104. The electrical current, supplied to the deposition anodes 111 via control of the grid control circuit 103, is provided by the power distribution circuit 104, which routes power from a power supply 121 of the electrochemical deposition system 100 to the deposition control circuits 115 and then to the deposition anodes 111. Although not shown, in some examples, the printhead 101 also includes features, such as insulation layers, that help protect other features of the printhead 101 from an electrolyte solution 110, as described in more detail below.

Figure 2A:
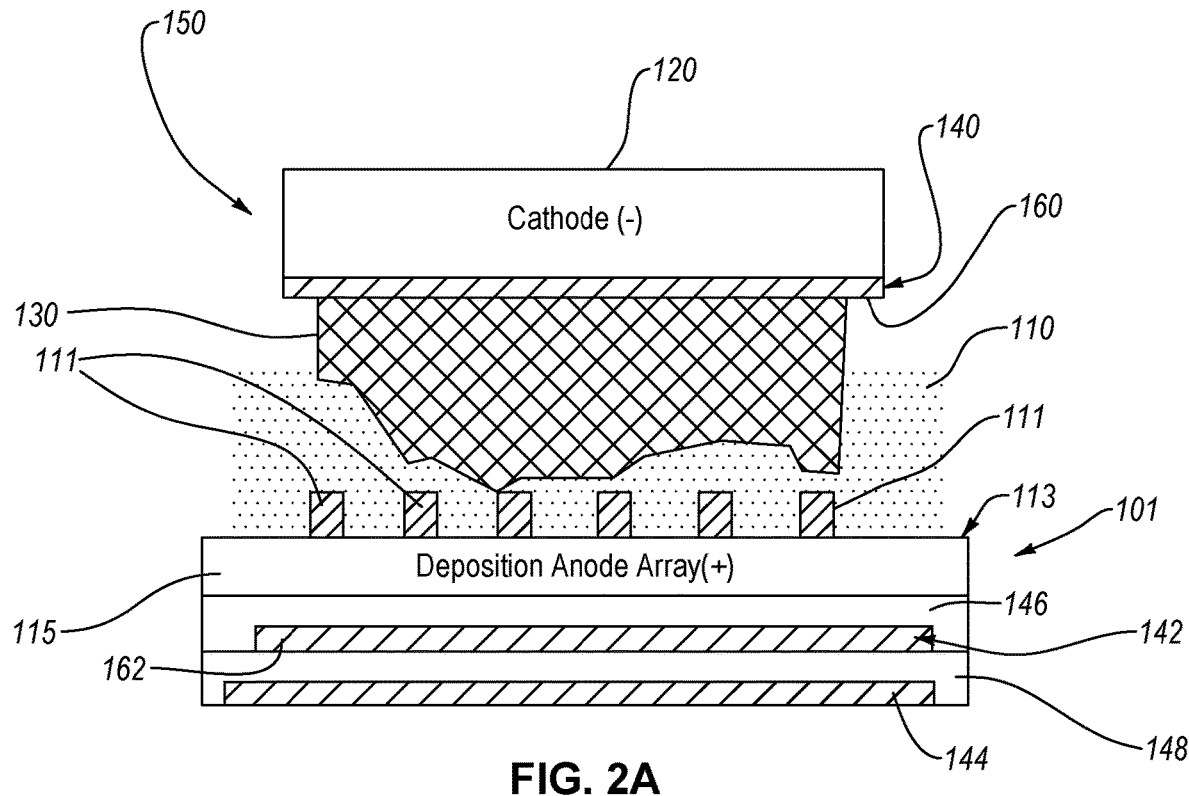
FIG. 2A is a schematic, elevation view of a capacitive sensor of the system of FIG. 1, according to one or more examples of the present disclosure.

The electrochemical deposition system 100 further includes a cathode 120 and the electrolyte solution 110, which can be contained within a partially enclosed container. In some examples, the electrolyte solution 110 includes one or more of, but not limited to, plating baths, associated with copper, nickel, tin, silver, gold, lead, etc., and which are typically comprised of water, an acid (such as sulfuric acid), metallic salt, and additives (such as levelers, suppressors, surfactants, accelerators, grain refiners, and pH buffers). The electrochemical deposition system 100 is configured to move the printhead 101 relative to the electrolyte solution 110 such that the deposition anodes 111 of the deposition anode array 113 are submersed in the electrolyte solution 110. When submersed in the electrolyte solution 110, as shown in FIG. 2A, and when an electrical current is supplied to the deposition anodes 111, an electrical path (or current) is formed through the electrolyte solution 110 from each one of the deposition anodes 111 to the cathode 120. The electrical paths in the electrolyte solution 110 induce electrochemical reactions in the electrolyte solution 110, between the deposition anodes 111 and the cathode 120, which results in the formation of layers of metal on the cathode 120 at locations corresponding to the locations of the deposition anodes 111. The layers of metal formed by supplying electrical current to multiple deposition anodes 111 collectively form a layer of a part 130 in some examples.

Multiple layers, in a stacked formation, at a given location on the cathode 120 can be formed by incrementally moving the cathode 120 away from the depositions anodes 111 and consecutively supplying an electrical current to the deposition anode 111 corresponding with that location. The part 130 can have an intricate and detailed shape by modifying or alternating the current flowing through the deposition anodes 111. For example, as shown in FIG. 1, first ones of the deposition anodes 111 are energized (shaded in FIG. 1), so that metal is being deposited near these "energized" deposition anodes 111, when second ones of the deposition anodes are not energized (unshaded in FIG. 1), so that metal is not being deposited near these "non-energized" deposition anodes 111.

In some examples, the electrochemical deposition system 100 further includes a processor 122. The printhead 101 is electrically coupled with the processor 122 such that the processor 122 can transmit electrical signals to the grid control circuit 103. In response to receipt of the electrical signals from the processor 122, the grid control circuit 103 sends corresponding electrical signals to the deposition control circuits 115 to selectively turn one or more of the deposition anodes 111 of the deposition anode array 113 on or off (or to modify the intensity of electrical current flow through each deposition anode 111). The processor 122 may be, for example and without limitation, a microcontroller, a microprocessor, a GPU, a FPGA, a SoC, a single-board computer, a laptop, a notebook, a desktop computer, a server, or a network or combination of any of these devices.

According to certain examples, the electrochemical deposition system 100 additionally includes one or more sensors 123. The processor 122 is electrically coupled with the sensors 123 to receive feedback signals from the sensors 123. The feedback signals include sensed characteristics of the system 100 that enable a determination of the progress of the metal deposition process for forming the part 130. The sensors 123 may include, for example and without limitation, current sensors, voltage sensors, timers, cameras, rangefinders, scales, force sensors, and/or pressure sensors.

One or more of the sensors 123 can be used to measure a distance between the cathode 120 and the deposition anode array 113. Measuring the distance between the cathode 120 and the deposition anode array 113 enables "zeroing" of the deposition anode array 113 relative to the cathode 120 before any metal layer of the part 130 is formed, or to set or confirm the relative position between the anode and cathode before forming each successive metal layer of the part 130. The accurate positioning of the cathode 120 relative to the deposition anode array 113 at the initialization of the deposition process may have a significant impact on the success and quality of the completed deposit. In certain examples, any of various types of sensors, for determining the distance between the cathode 120 and the deposition anode array 113 can be used, including, for example and without limitation, mechanical, electrical, or optical sensors, or combinations thereof. In one or more examples, mechanical sensors, such as a pressure sensor, switch, or load cell may be employed, which detects when the cathode 120 is moved and relocated into a desired location. In one or more examples, one or more components of the electrochemical deposition system 100 may be energized, and the cathode 120 may be moved into proximity of the energized components. When a corresponding voltage or current is detected on the cathode 120, the cathode 120 can be considered to be in a known location. According to some examples, other types of sensors, such as those that detect, for example, capacitance, impedance, magnetic fields, or that utilize the Hall Effect, can be used to determine the location of the cathode 120 relative to the deposition anode array 113. As described in more detail below (see, e.g., FIGS. 2A and 2B), in some examples, the electrochemical deposition system 100 includes a capacitive sensor 150 for promoting detection of the distance between the cathode 120 and the deposition anode array 113.

Referring to FIG. 1, the electrochemical deposition system 100 further includes a position actuator 124. As shown in the illustrated example, the cathode 120 is coupled to the position actuator 124 such that actuation of the position actuator 124 moves the cathode 120 relative to the printhead 101 (and thus relative to the deposition anode array 113). However, in other examples, the printhead 101, rather than the cathode 120, is coupled to the position actuator 124 such that actuation of the position actuator 124 moves the printhead 101 relative to the cathode 120. In yet other examples, both the cathode 120 and the printhead 101 are coupled to the position actuator 124 such actuation of the position actuator 124 results in one or both of the cathode 120 and the printhead 101 moving relative to the other. The position actuator 124 can be a single actuator or multiple actuators that collectively form the position actuator 124. In certain examples, the position actuator 124 controls vertical movement 125, so that the cathode 120 may be raised, relative to the printhead 101, as successive layers of the part 130 are built. Alternatively, or additionally, in some examples, the position actuator 124 controls vertical movement 125, so that the printhead 101 may be lowered, relative to the cathode 120, as successive layers of the part 130 are built. In one or more examples, the position actuator 124 also moves the cathode 120, moves the printhead 101, or moves both the cathode 120 and the printhead 101 horizontally, relative to one another, so that, for example, parts having a footprint larger than the footprint of the deposition anode array 113 can be formed (see, e.g., dashed directional arrows associated with the directional arrow corresponding with the vertical movement 125).

Although not shown with particularity in FIG. 1, in one or more examples, the electrochemical deposition system 100 includes a fluid handling system and a fluid chamber or container that contains the electrolyte solution 110. The fluid system may include for example a tank, a particulate filter, chemically resistant tubing, and a pump. The electrochemical deposition system 100 can further include analytical equipment that enables continuous characterization of bath pH, temperature, and ion concentration using methods such as conductivity, high performance liquid chromatography, mass spectrometry, cyclic voltammetry stripping, spectrophotometer measurements, or the like. Bath conditions may be maintained with a chiller, heater and/or an automated replenishment system to replace solution lost to evaporation and/or ions of deposited material.

Although the electrochemical deposition system 100 shown in FIG. 1 has a single printhead 101 with a single deposition anode array 113, in one or more alternative examples, the electrochemical deposition system 100 includes multiple printheads 101, each with one or more deposition anode arrays 113, or a single printhead 101 with multiple deposition anode arrays 113. These multiple deposition anode arrays 113 may operate simultaneously in different chambers filled with electrolyte solution, or may be tiled in a manner where the deposition anode arrays 113 work together to deposit material on a shared cathode or series of cathodes.

Figure 2B:
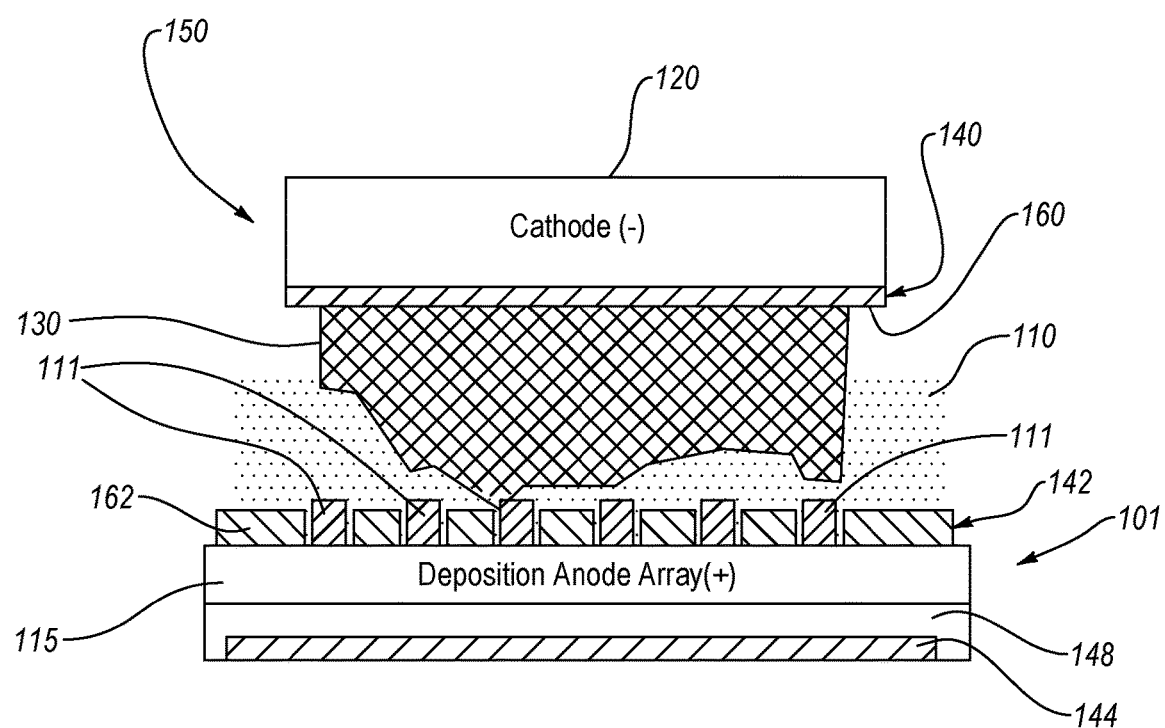
FIG. 2B is a schematic, elevation view of a capacitive sensor of the system of FIG. 1, according to one or more examples of the present disclosure.

Referring to FIGS. 2A and 2B, in some examples, the electrochemical deposition system 100 includes a capacitive sensor 150 that is integrated into the cathode 120 and the printhead 101. The capacitive sensor can be used to detect the position, orientation, and planarity, among other parameters, of the cathode 120 and the printhead 101 relative to each other. For proper deposition of material onto the cathode 120 to form the part 130, the cathode 120 and the printhead 101 (e.g., the deposition anode array 113) should be planar (e.g., non-bowed), vertically aligned relative to each other, and parallel relative to each other. The capacitive sensor 150 of the electrochemical deposition system 100 enables detection of the position, orientation, and planarity of the printhead 101 and/or the cathode 120 prior to and/or during deposition of material onto the cathode 120.

Figure 3:
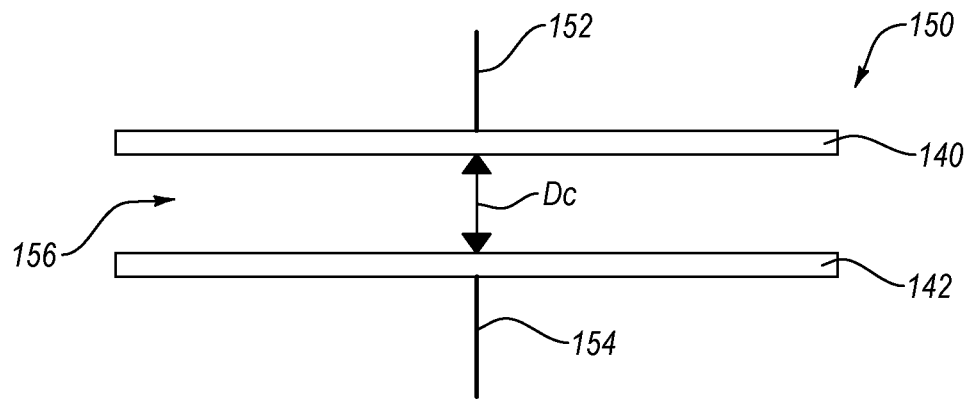
FIG. 3 is a block diagram of a capacitor circuit corresponding with the capacitive sensor of FIG. 2A or FIG. 2B, according to one or more examples of the present disclosure.
Figure 5A:
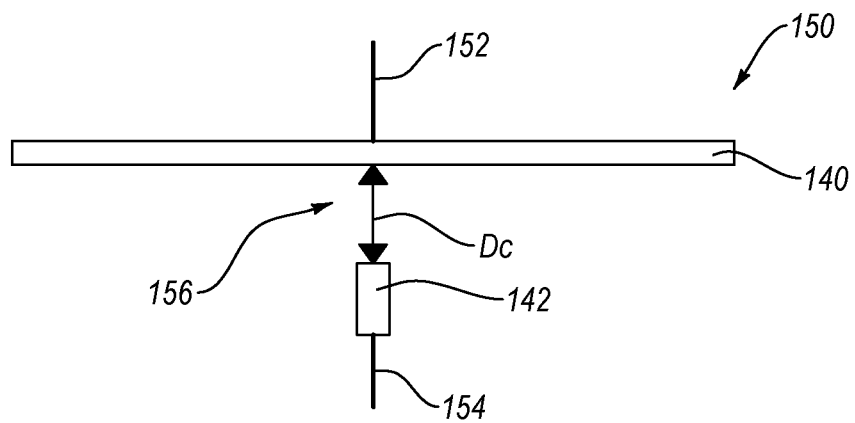
FIG. 5A is a block diagram of a capacitor circuit corresponding with the capacitive sensor of FIG. 4, according to one or more examples of the present disclosure.
Figure 5B:
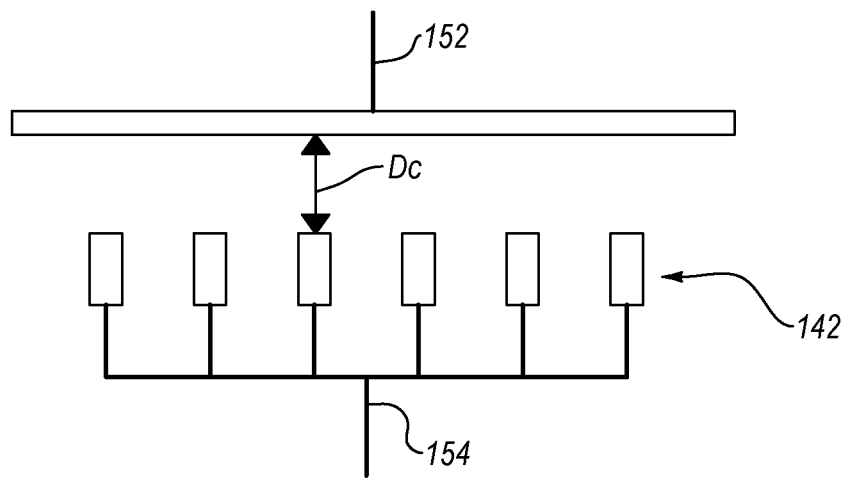
FIG. 5B is a block diagram of a capacitor circuit corresponding with the capacitive sensor of FIG. 4, according to one or more examples of the present disclosure.

As shown schematically in FIGS. 3, 5A, and 5B, the capacitive sensor 150 includes a first electrically-conductive layer 140 fixed to the cathode 120, such that the first electrically-conductive layer 140 co-moves with the cathode 120. The capacitive sensor 150 further includes a second electrically-conductive layer 142 fixed to the printhead 101, such that the second electrically-conductive layer 142 co-moves with the printhead 101. Each one of the first electrically-conductive layer 140 and the second electrically-conductive layer 142 has a surface area. The capacitive sensor 150 utilizes the first electrically-conductive layer 140, as one terminal of the capacitive sensor 150, and the second electrically-conductive layer 142, as the other or opposite terminal of the capacitive sensor 150. Additionally, the capacitive sensor 150 further includes a dielectric layer 156 between the first electrically-conductive layer 140 and the second electrically-conductive layer 142. A distance $D_C$ between the first electrically-conductive layer 140 and the second electrically-conductive layer 142 is equal to a thickness of the dielectric layer 156. The dielectric layer 156 has a permittivity value.

Although in the examples shown, the first electrically-conductive layer 140 is fixed to the cathode 120 and co-moves with the cathode 120 and the second-electrically conductive layer 142 is fixed to the printhead 101 and co-moves with the printhead 101, in other examples, the first electrically-conductive layer 140 is merely at a known location relative to the cathode 120 and the second-electrically conductive layer 142 is merely at a known location relative to the printhead. Knowing the location of the first electrically-conductive layer 140 relative to the cathode 120, whether the first electrically-conductive layer 140 is co-movable with or movable relative to the cathode 120, and knowing the location of the second electrically-conductive layer 142 relative to the printhead 101, whether the second electrically-conductive layer 142 is co-movable with or movable relative to the printhead 101, enables the capacitive sensor 150 to help determine the location of the cathode 120 relative to the printhead 101.

Generally, the capacitive sensor 150 has a capacitance, corresponding with how much electrical charge can be stored on one of the first electrically-conductive layer 140 and the second electrically-conductive layer 142 for a given voltage response of the capacitive sensor 150. The capacitance (of the capacitive sensor 150 is equal to $\varepsilon*(A/d)$, where $\varepsilon$ is equal to the permittivity of the dielectric between the first electrically-conductive layer 140 and the second electrically-conductive layer 142, A is equal to the area of overlap between the first electrically-conductive layer 140 and the second electrically-conductive layer 142, and d is the distance between the first electrically-conductive layer 140 and the second electrically-conductive layer 142. Because the surface area of the first electrically-conductive layer 140 and the second electrically-conductive layer 142 is known, the permittivity of the dielectric layer 156 is also known, and the capacitance of the capacitive sensor 150 can be measured, the distance $D_C$, between the first electrically-conductive layer 140 and the second electrically-conductive layer 142, can be determined. Electrical power can be supplied to the capacitive sensor 150 via one of a first electrical lead 152 and a second electrical lead 154 of the capacitive sensor 150, and an electrical response signal from the other one of the first electrical lead 152 and the second electrical lead 154 can be monitored and used, such as by the processor 122, to measure the capacitance of the capacitive sensor 150. The first electrical lead 152 is electrically coupled to the first electrically-conductive layer 140 and the second electrical lead 154 is electrically coupled to the second electrically-conductive layer 142.

The first electrically-conductive layer 140 is a single-function feature, in some examples, and a multi-function feature, in other examples. More specifically, in some examples, first electrically-conductive layer 140 is fixed to the cathode 120 for the sole purpose of functioning as a terminal of the capacitive sensor 150. However, in other examples, the first electrically-conductive layer 140 provides functionality in addition to that of a terminal of the capacitive sensor 150. In the illustrative example of FIG. 2A, the electrochemical deposition system 100 includes a seed layer 160 applied onto the cathode 120. The seed layer 140 is made of an electrically conductive material, such as, but not limited to, copper, steel, stainless steel, gold, silver, nickel, tin, zinc, platinum, and chrome. Generally, the seed layer 140 acts as an interface or base layer to promote the application of material (e.g., formation of the part 130) onto the cathode 120. In other words, in some examples, the seed layer 140 is necessary for material to form onto and remain coupled to the cathode 120 during the material deposition process. Moreover, because the seed layer 160 is made of an electrically-conductive material and forms a generally plate-like structure, the seed layer 160 is also capable of acting as the first electrically-conductive layer 140 of the capacitive sensor 150. Accordingly, the seed layer 160 forms the first electrically-conductive layer 140 or the first electrically-conductive layer 140 comprises the seed layer 160. In such latter examples, where the first electrically-conductive layer 140 is a multi-function feature, no additional stand-alone parts are needed to incorporate the first electrically-conductive layer 140 of the capacitive sensor 150 into the electrochemical deposition system 100.

Like the first electrically-conductive layer 140, the second electrically-conductive layer 142 is a single-function feature, in some examples, and a multi-function feature, in other examples. In either of the examples, the second electrically-conductive layer 142 is fixed to the printhead 101 (and thus can be considered to form part of the printhead 101).

In some examples where the second electrically-conductive layer 142 is a single-function feature, the sole purpose of the second electrically-conductive layer 142 is to function as a terminal of the capacitive sensor 150. In certain examples, the second electrically-conductive layer 142 includes a metal layer 162 fixed directly to the deposition anode array 115, but below the deposition anodes 111, such that the deposition anodes 111 are located between the metal layer 162 and the cathode 120. But, in other examples, such as shown in FIG. 2A, the first electrically-conductive layer 140 includes a metal layer 162 that is fixed indirectly to the deposition anode array 115, such that at least one intervening layer is interposed between the metal layer 162 and the deposition anode array 115. In FIG. 2A, the metal layer 162 of the second electrically-conductive layer 142 is formed in (e.g., embedded in) a first insulation layer 146, which is attached to the deposition anode array 115. In this manner, the first insulation layer 146 is interposed between the metal layer 162 of the second electrically-conductive layer 142 and the deposition anode array 115. The first insulation layer 146 is made of an electrically non-conductive material and acts as a base to support the second electrically-conductive layer 142 in place relative to the deposition anode array 115. As described below, the metal layer 142, in conjunction with the first electrically-conductive layer 140 can be used explicitly to set the gap between the printhead 101 and the cathode 120 (e.g., the substrate).

In contrast to the example of FIG. 2A, where the metal layer 162 is parallel to and positioned below the deposition anodes 111 of the deposition anode array 115, in the example of FIG. 2B, the metal layer 162 is co-planar with the deposition anodes 111 of the deposition anode array 115. In such an example, the metal layer 162 is formed on the same surface of the deposition anode array 115 as the deposition anodes 111. The metal layer 162 is shaped to avoid contact with the deposition anodes 111 such that the metal layer 162 is electrically isolated from the deposition anodes 111. Although not shown, in some examples, an electrically non-conductive material can be positioned between the metal layer 162 and the deposition anodes 111. Additionally, although the metal layer 162 appears to have multiple spaced apart sections, the metal layer 162 can be a single layer with cutouts or openings through which the deposition anodes 111 extend. Additionally, although not shown, in some examples, an additional insulation layer can be applied over the metal layer 162, such that the metal layer 162 is between a portion of the additional insulation layer and the deposition anode array 115. In such examples, the additional insulation layer can have openings that expose the deposition anodes 111 to the electrolyte solution 110.

However, in other examples, the second electrically-conductive layer 142 provides functionality in addition to that of terminal of the capacitive sensor 150. In the illustrative example of FIGS. 3 and 4, because a deposition anode 111 is made of an electrically-conductive material and forms a generally plate-like structure, a deposition anode 111 is also capable of acting as the second electrically-conductive layer 142 of the capacitive sensor 150. Accordingly, a deposition anode 111 forms the second electrically-conductive layer 142 or the second electrically-conductive layer 142 comprises a deposition anode 111. In these examples, where the second electrically-conductive layer 142 is a multi-function feature, no additional stand-alone parts are needed to incorporate the second electrically-conductive layer 142 of the capacitive sensor 150 into the electrochemical deposition system 100. Referring to FIG. 5A, in such examples, the second electrical lead 154 can be coupled to a single one of the deposition anodes 111 such that the second electrically-conductive layer 142 of the capacitive sensor 150 includes just a single one of the deposition anodes 111. However, as shown in FIG. 5B, in other examples, the second electrical lead 154 can be electrically coupled in parallel with multiple deposition anodes 111 such that the second electrically-conductive layer 142 of the capacitive sensor 150 includes multiple deposition anodes 111.

Figure 4:
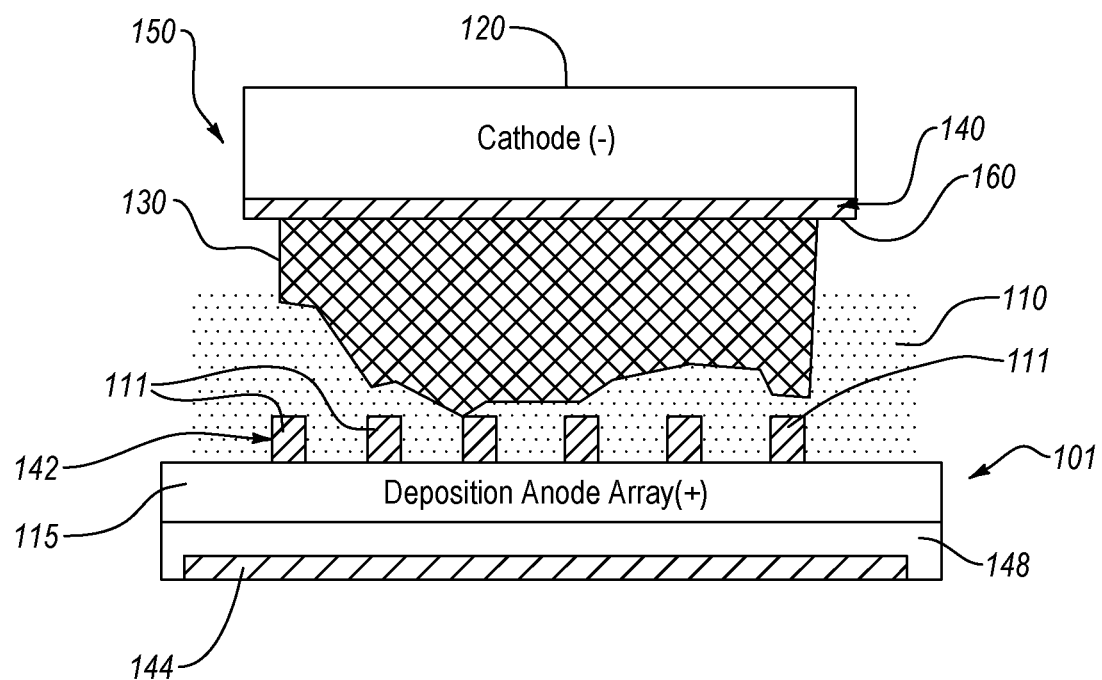
FIG. 4 is a schematic, elevation view of a capacitive sensor of the system of FIG. 1, according to one or more examples of the present disclosure.

Referring to FIGS. 2A and 4, in some examples, the capacitive sensor 150 further includes an interference shield 144. The interference shield 144 is located on the printhead 101 such that the second electrically-conductive layer 142 is interposed between the interference shield 144 and the first electrically-conductive layer 140. The interference shield 144 helps to reduce electromagnetic interference (EMI) in the capacitive circuit formed by the capacitive sensor 150. In some examples, the interference shield 144 is fixed indirectly to either the second electrically-conductive layer 142 or the deposition anode array 115, such that at least one intervening layer is interposed between the interference shield 144 and the second electrically-conductive layer 142. In FIGS. 2A and 4, the interference shield 144 is formed in (e.g., embedded in) a second insulation layer 148, which is attached to the second electrically-conductive layer 142 (see, e.g., FIG. 2A) or to the deposition anode array 115 (see, e.g., FIG. 4). In this manner, the second insulation layer 148 is interposed between the interference shield 144 and the deposition anode array 115. The second insulation layer 148 is made of an electrically non-conductive material and acts as a base to support the interference shield 144 in place relative to the deposition anode array 115.

Although the examples shown in FIGS. 2A-5B have been described in terms of an electrochemical deposition system 100 with a single capacitive sensor 150, in other examples, the electrochemical deposition system 100 includes a plurality of capacitive sensors. Each one of the plurality of capacitive sensors of such a system can be configured in a manner similar to that of the capacitive sensor 150 previously described. In other words, the description of features of the capacitive sensor 150 is equally applicable to each one of the plurality of capacitive sensors of such a system unless otherwise indicated. The plurality of capacitive sensors can be strategically positioned around the printhead 101 to promote the detection of the same or different properties of the electrochemical deposition system 100. In some examples, the plurality of capacitive sensors are strategically positioned such that one or more of the capacitive sensors detect one property and another one or more of the capacitive sensors detect a different property.

Figure 6A:
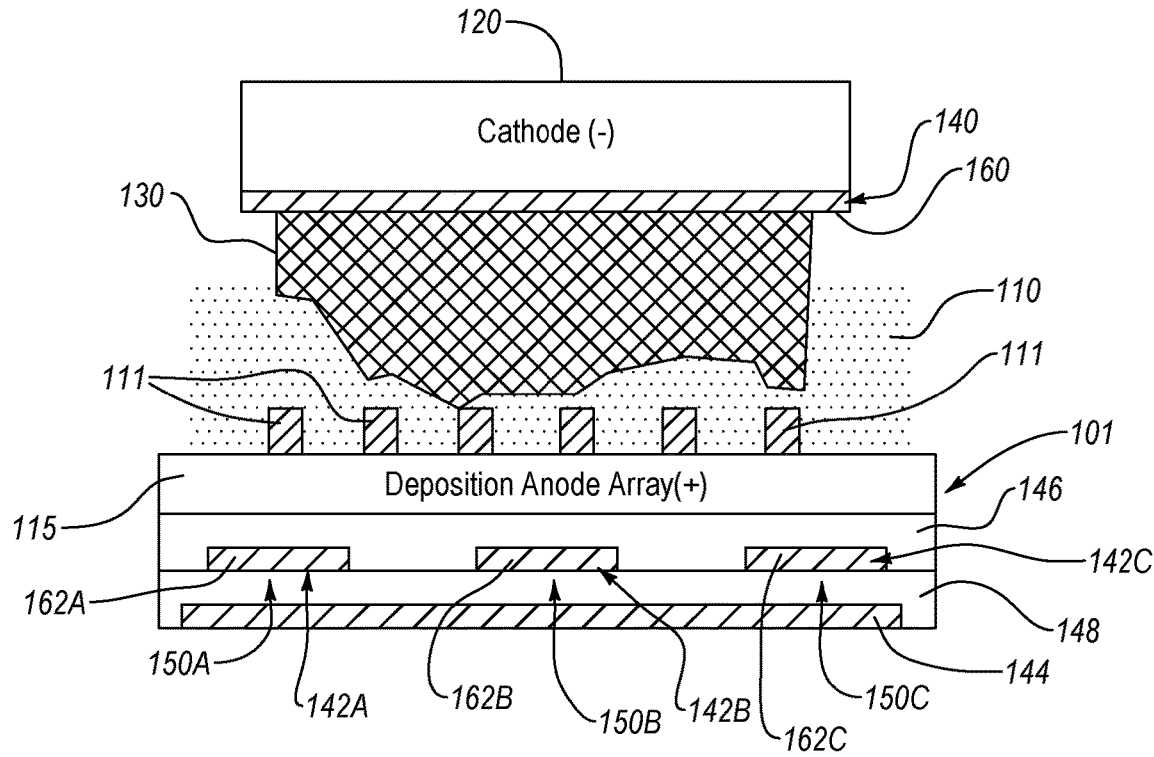
FIG. 6A is a schematic, elevation view of a capacitive sensor of the system of FIG. 1, according to one or more examples of the present disclosure.
Figure 6B:
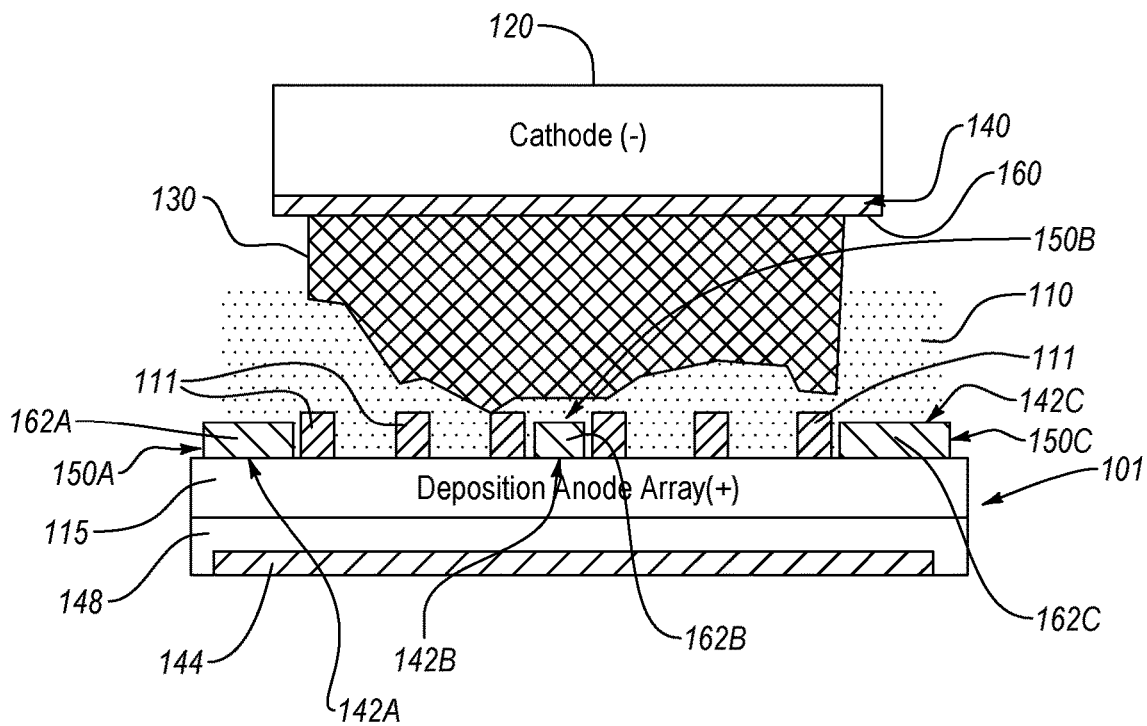
FIG. 6B is a schematic, elevation view of a capacitive sensor of the system of FIG. 1, according to one or more examples of the present disclosure.
Figure 7:
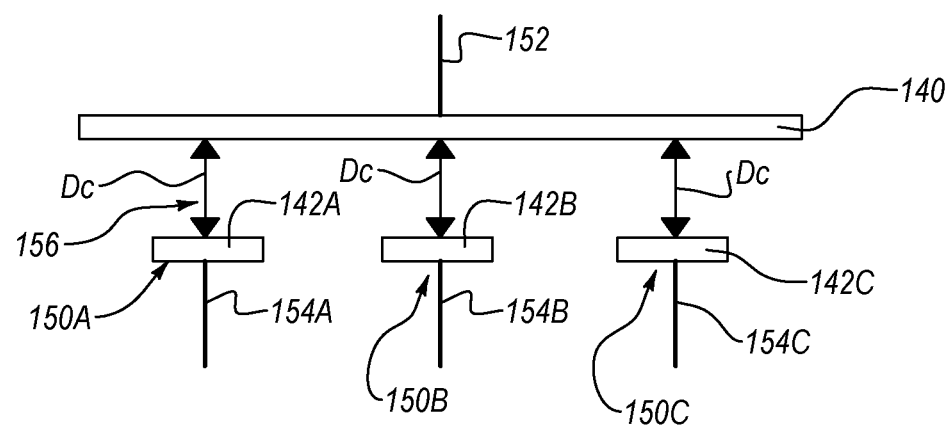
FIG. 7 is a block diagram of a capacitor circuit corresponding with the capacitive sensor of FIG. 6A or FIG. 6B, according to one or more examples of the present disclosure.

Referring to FIGS. 6A, 6B, and 7, according to one example, the electrochemical deposition system 100 includes a plurality of capacitive sensors each having a single-function conductive layer. More specifically, the electrochemical deposition system 100 of FIGS. 6A, 6B, and 7 includes a first capacitive sensor 150A, a second capacitive sensor 150B, and a third capacitive sensor 150C. The second electrically-conductive layer 142A of the first capacitive sensor 150A includes a first metal layer 162A. The second electrically-conductive layer 142B of the second capacitive sensor 150B includes a second metal layer 162B. The third electrically-conductive layer 142C of the third capacitive sensor 150C includes a third metal layer 162C. The first metal layer 162A, the second metal layer 162B, and the third metal layer 162C can be located under the deposition anodes 111, such as on spaced apart planes (see, e.g., FIG. 6A) or can be co-planar with the deposition anodes 111, such as on the same planes (see, e.g., FIG. 6B). The second electrically-conductive layer of each one of the first capacitive sensor 150A, the second capacitive sensor 150B, and the third capacitive sensor 150C is electrically coupled with a corresponding one of a first second-electrical-lead 154A, a second second-electrical-lead 154B, and a third second-electrical-lead 154C. The first second-electrical-lead 154A, the second second-electrical-lead 154B, and the third second-electrical-lead 154C are electrically isolated from each other to provide electrical response signals independent of each other. In this manner, the capacitance of each one of the first capacitive sensor 150A, the second capacitive sensor 150B, and the third capacitive sensor 150C, and the corresponding distances $D_C$, can be individually determined. Although three capacitive sensors 150A-C are shown in FIGS. 6 and 7, in other examples, any quantity of capacitive sensors 150A-N that utilize a single-function second electrically-conductive layer, where N is any whole number, can be implemented using the same principles outlined above.

Additionally, although not shown in FIG. 6B, in some examples, an additional insulation layer can be applied over the metal layers 162A-162C, such that the metal layers 162A-162C are between portions of the additional insulation layer and the deposition anode array 115. In such examples, the additional insulation layer can have openings that expose the deposition anodes 111 to the electrolyte solution 110.

Figure 8:
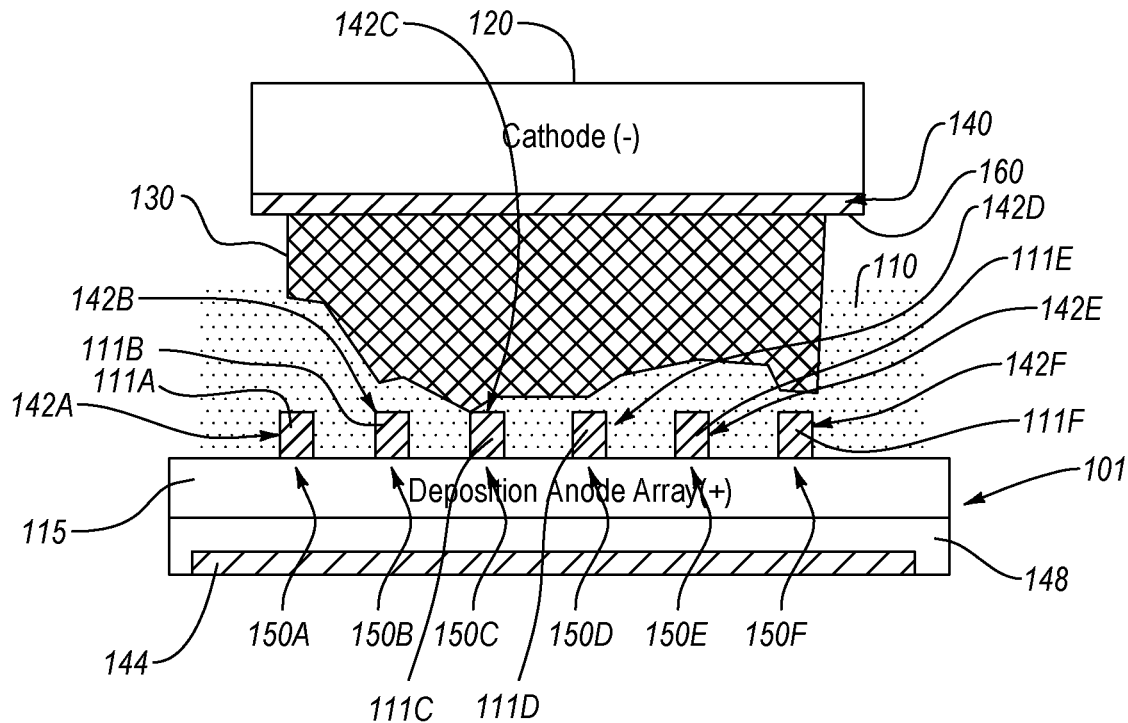
FIG. 8 is a schematic, elevation view of a capacitive sensor of the system of FIG. 1, according to one or more examples of the present disclosure.
Figure 9:
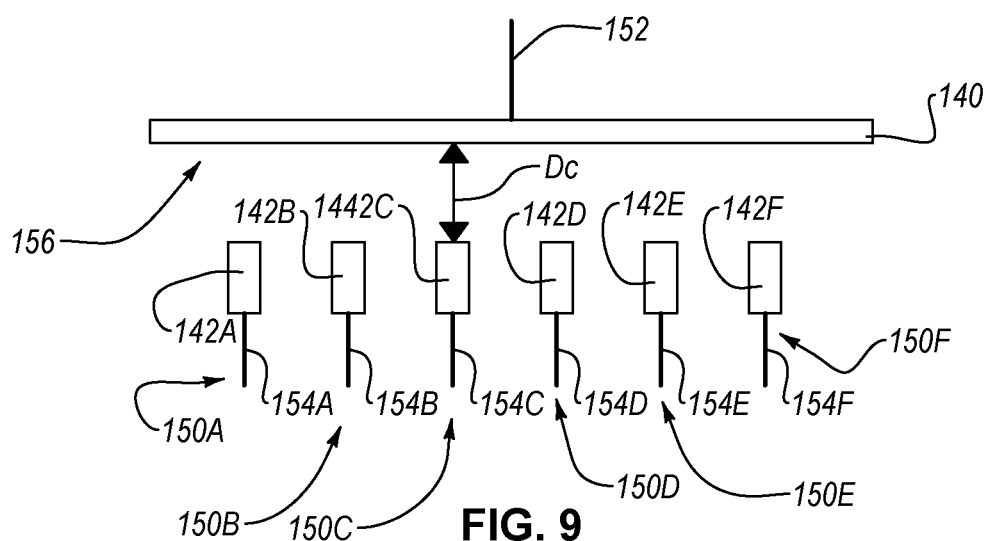
FIG. 9 is a block diagram of a capacitor circuit corresponding with the capacitive sensor of FIG. 8, according to one or more examples of the present disclosure.

Referring to FIGS. 8 and 9, according to one example, the electrochemical deposition system 100 includes a plurality of capacitive sensors each having a multi-function conductive layer. More specifically, the electrochemical deposition system 100 of FIGS. 8 and 9 includes a first capacitive sensor 150A, a second capacitive sensor 150B, a third capacitive sensor 150C, a fourth capacitive sensor 150D, a fifth capacitive sensor 150E, a sixth capacitive sensor 150F. The second electrically-conductive layer 142A of the first capacitive sensor 150A includes a first deposition anode 111A. The second electrically-conductive layer 142B of the second capacitive sensor 150B includes a second deposition anode 111B. The second electrically-conductive layer 142C of the third capacitive sensor 150C includes a third deposition anode 111C. The second electrically-conductive layer 142D of the fourth capacitive sensor 150D includes a fourth deposition anode 111D. The second electrically-conductive layer 142E of the fifth capacitive sensor 150E includes a fifth deposition anode 111E. The second electrically-conductive layer 142F of the sixth capacitive sensor 150F includes a fifth deposition anode 111F. Accordingly, the deposition anodes 111 are multi-functional in that they provide both material deposition functionality and capacitive sensing functionality.

The second electrically-conductive layer of each one of the first capacitive sensor 150A, the second capacitive sensor 150B, the third capacitive sensor 150C, the fourth capacitive sensor 150D, the fifth capacitive sensor 150E, and the sixth capacitive sensor 150F is electrically coupled with a corresponding one of a first second-electrical-lead 154A, a second second-electrical-lead 154B, a third second-electrical-lead 154C, a fourth second-electrical-lead 154D, a fifth second-electrical-lead 154E, and a sixth second-electrical-lead 154F. The first second-electrical-lead 154A, the second second-electrical-lead 154B, the third second-electrical-lead 154C, the fourth second-electrical-lead 154D, the fifth second-electrical-lead 154E, and the sixth second-electrical-lead 154F are electrically isolated from each other to provide electrical response signals independent of each other. In this manner, the capacitance of each one of the first capacitive sensor 150A, the second capacitive sensor 150B, the third capacitive sensor 150C, the fourth capacitive sensor 150D, the fifth capacitive sensor 150E, and the sixth capacitive sensor 150F, and the corresponding distances $D_C$, can be individually determined. However, in other examples, the first second-electrical-lead 154A, the second second-electrical-lead 154B, the third second-electrical-lead 154C, the fourth second-electrical-lead 154D, the fifth second-electrical-lead 154E, and the sixth second-electrical-lead 154F can be electrically coupled, such as via operation of the grid control circuit 103, such that the deposition anodes 111A-F can collectively function as a single second electrically-conductive layer. In certain examples, the grid control circuit 103 is operable to enable multiplexing of the capacitive sensors by switching between individual capacitive sensing by the deposition anodes (e.g., each deposition anode functioning as part of a separate capacitive sensor) and collective capacitive sensing by the deposition anodes (e.g., multiple deposition anodes functioning as part of a single capacitive sensor).

Although six capacitive sensors 150A-F are shown in FIGS. 8 and 9, in other examples, any quantity of capacitive sensors 150A-F that utilize a multi-function second electrically-conductive layer, where N is any whole number, can be implemented using the same principles outlined above. It is also recognized, that any two or more of the deposition anodes 111A-N can be electrically coupled together in parallel via the same second electrical lead to effective form a single capacitance sensor have a larger area. In this manner, the electrochemical deposition system 100 can have multiple capacitance sensors where at least one of the capacitance sensors is formed by a first quantity of deposition anodes (e.g., 1-N) and at least one of the capacitance sensors is formed by a second quantity of deposition anodes (e.g., 1-N), where the first quantity is different than the second quantity.

Figure 10A:
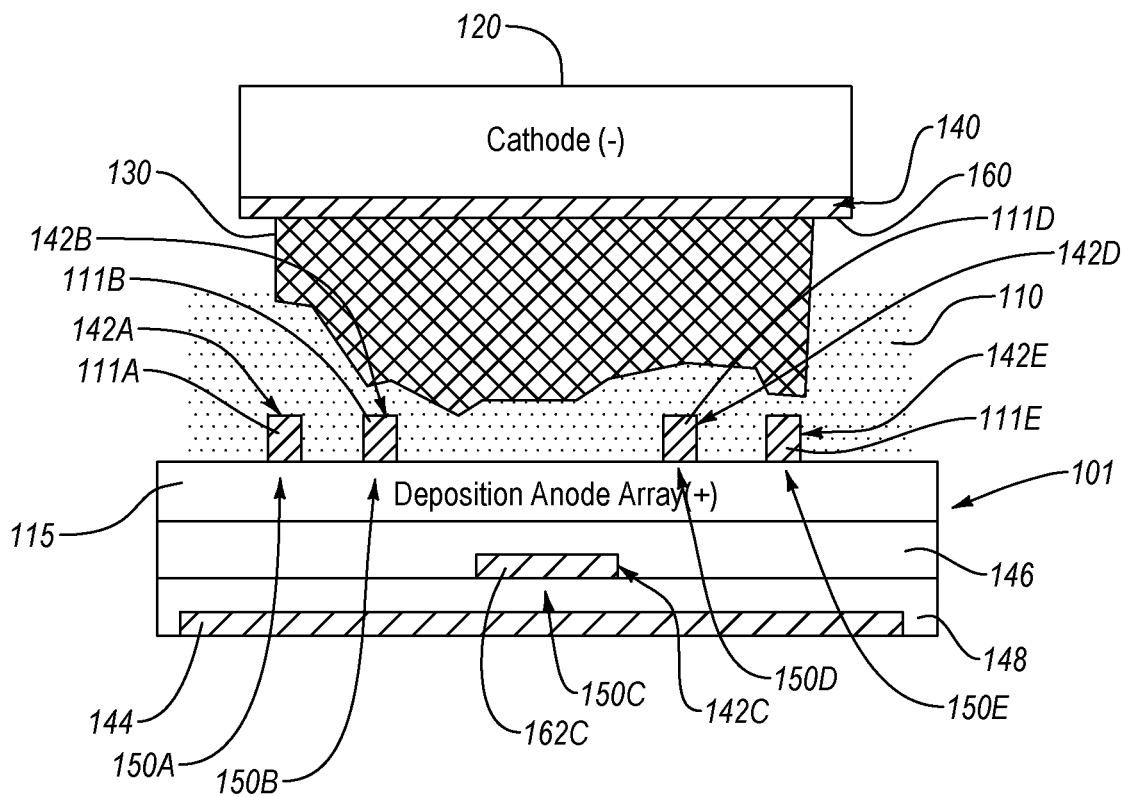
FIG. 10A is a schematic, elevation view of a capacitive sensor of the system of FIG. 1, according to one or more examples of the present disclosure.
Figure 10B:
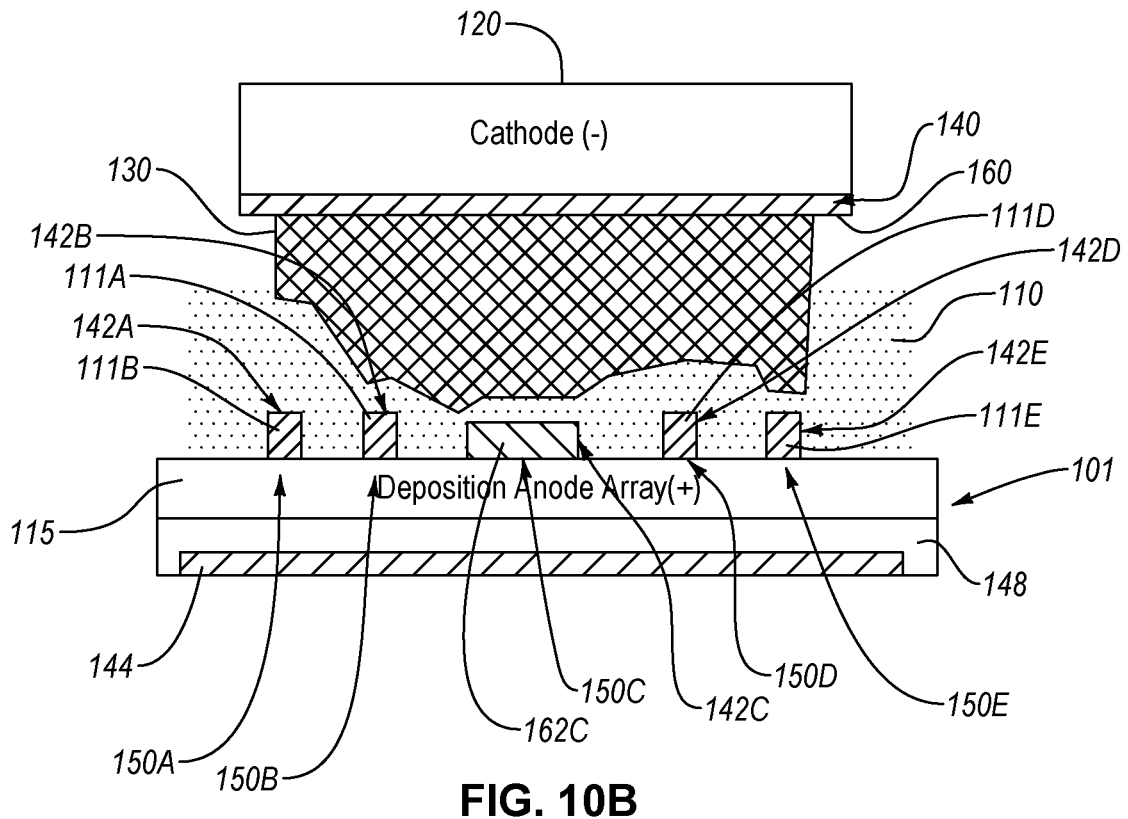
FIG. 10B is a schematic, elevation view of a capacitive sensor of the system of FIG. 1, according to one or more examples of the present disclosure.
Figure 11:
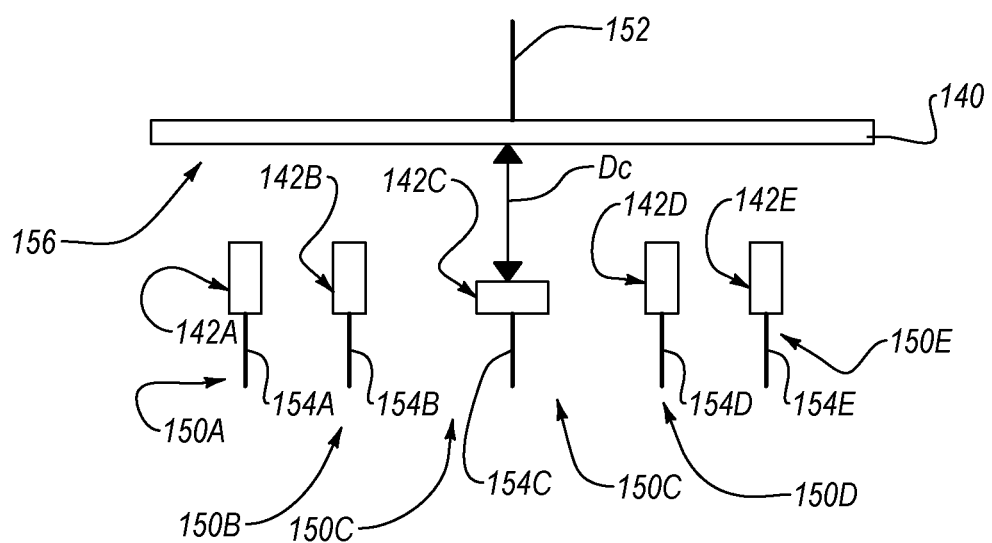
FIG. 11 is a block diagram of a capacitor circuit corresponding with the capacitive sensor of FIG. 10A or FIG. 10B, according to one or more examples of the present disclosure.

Referring to FIGS. 10 and 11, according to certain examples, the electrochemical deposition system 100 includes at least one capacitance sensor having a single-function conductive layer and at least one capacitance sensor having a multi-function conductive layer. Such examples can be considered to take a hybrid approach to capacitive sensing. As shown, in some examples, the electrochemical deposition system 100 includes a plurality of capacitance sensors that rely on one or more deposition anodes to function as the second electrically-conductive layer of each capacitance sensor. Additionally, the electrochemical deposition system 100 includes a capacitance sensor that relies on a stand-alone metal layer to function as the second electrically-conductive layer of the capacitance sensor.

In the illustrative example, shown in FIGS. 10A, 10B, and 11, the electrochemical deposition system 100 includes a first capacitive sensor 150A, a second capacitive sensor 150B, a third capacitive sensor 150C, a fourth capacitive sensor 150D, and a fifth capacitive sensor 150E. The second electrically-conductive layer 142A of the first capacitive sensor 150A includes a first deposition anode 111A. The second electrically-conductive layer 142B of the second capacitive sensor 150B includes a second deposition anode 111B. The second electrically-conductive layer 142D of the fourth capacitive sensor 150D includes a fourth deposition anode 111D. The second electrically-conductive layer 142E of the fifth capacitive sensor 150E includes a fifth deposition anode 111E. In contrast, the second electrically-conductive layer 142C of the third capacitive sensor 150C includes a metal layer 162C. At the location of the metal layer 162C, there are no deposition anodes. In other words, on the surface of the printhead 101 to which the deposition anodes are coupled, there is a space or gap corresponding with the location of the metal layer. In the example of FIG. 10A, the metal layer 162C is shown embedded below or underneath the deposition anodes 111 of the deposition anode array 115 such that the metal layer 162C is not co-planar. In contrast, in the example of FIG. 10B, the metal layer 162C is shown applied onto the same surface to which the deposition anodes 111 are coupled such that the metal layer 162C and the deposition anodes 111 are co-planar.

Referring to FIGS. 12A-18, various examples of the spatial arrangement of capacitance sensors for detecting various properties of the cathode 120 relative to the printhead 101 are shown. The spatial arrangement of the capacitance sensors shown in FIGS. 12A-14 help to detect and, in some instances, correct orientation (e.g., tilting) of the cathode 120 relative to the printhead 101. Next, the spatial arrangement of the capacitance sensors shown in FIGS. 15-17 help to detect and, in some instances, correct planarity (e.g., bowing) of one or both of the cathode 120 and the printhead 101. Finally, the spatial arrangement of the capacitance sensors shown in FIG. 18 help to detect and, in some instances, correct positioning (e.g., lateral misalignment) of the cathode 120 relative to the printhead 101.

Figure 12A:
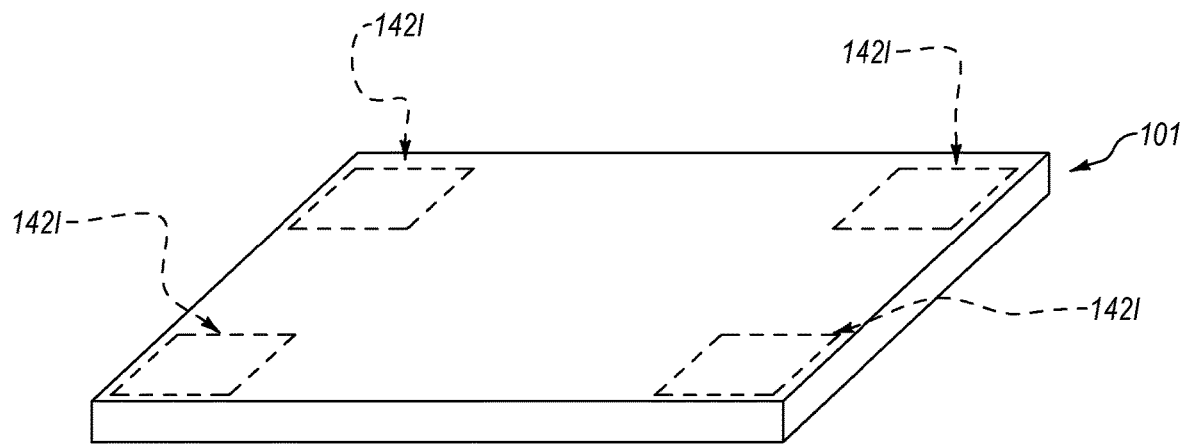
FIG. 12A is a schematic, perspective view of a printhead of the system of FIG. 1, according to one or more examples of the present disclosure.
Figure 12B:
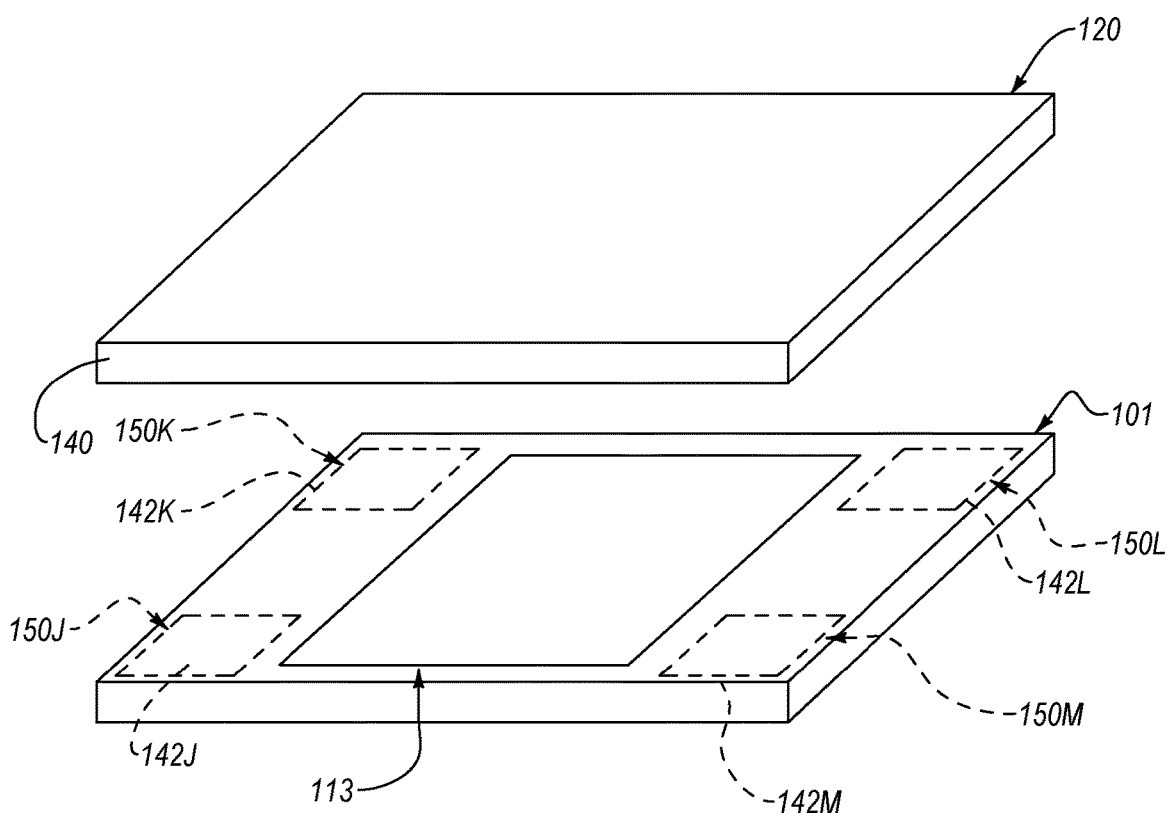
FIG. 12B is a schematic, perspective view of a capacitive sensor of the system of FIG. 1, according to one or more examples of the present disclosure.
Figure 12C:
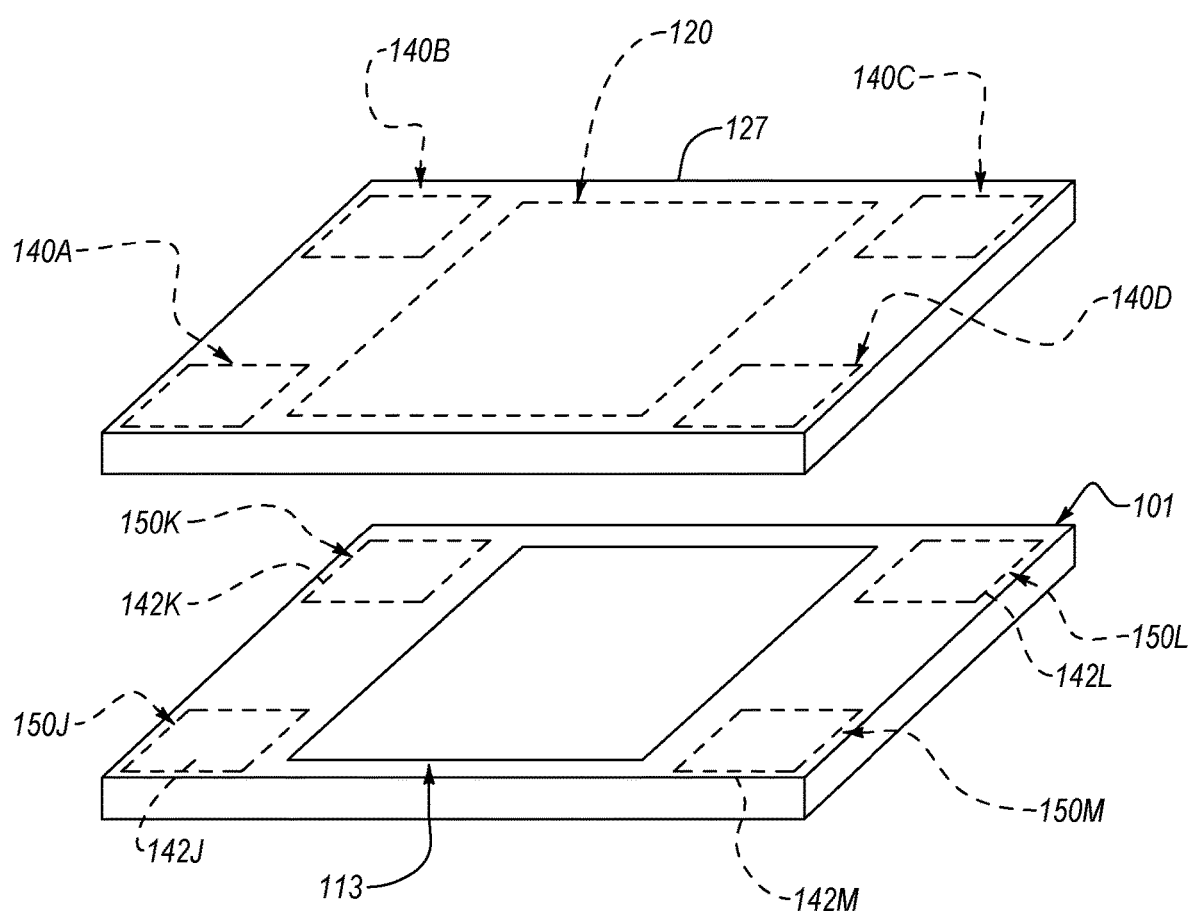
FIG. 12C is a schematic, perspective view of a capacitive sensor of the system of FIG. 1, according to one or more examples of the present disclosure.
Figure 13:
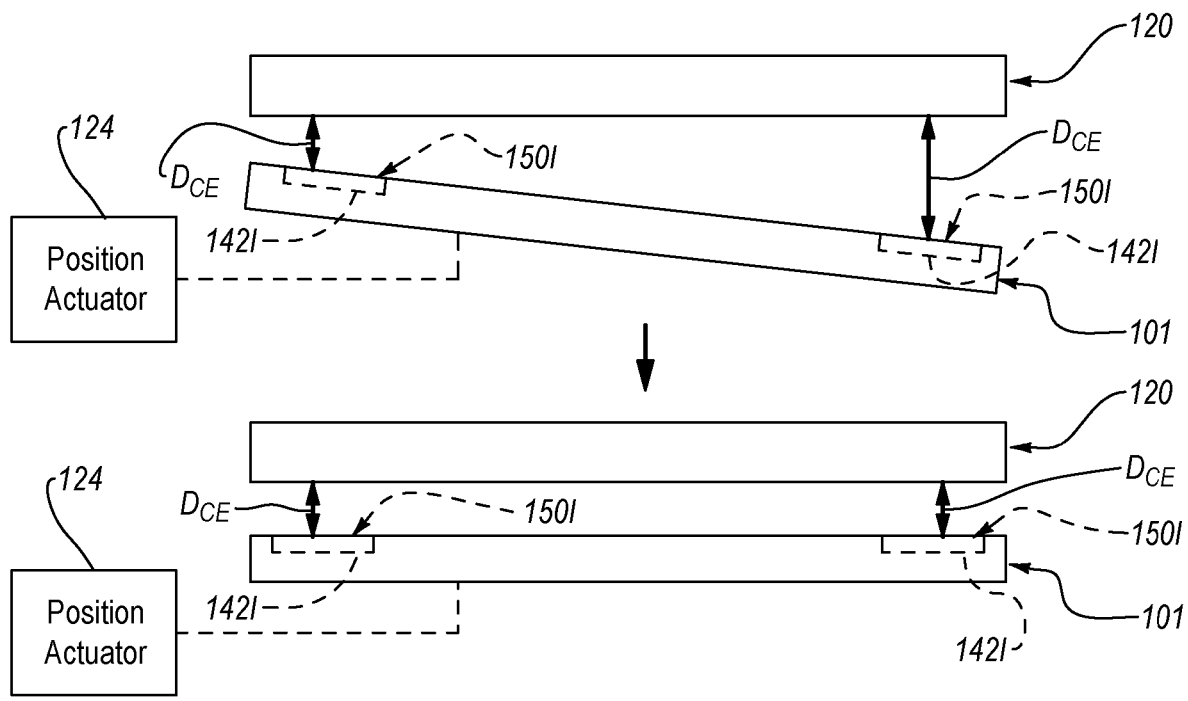
FIG. 13 is a schematic, elevation view of the printhead of FIG. 12A and a cathode of the system of FIG. 1, according to one or more examples of the present disclosure.
Figure 14:
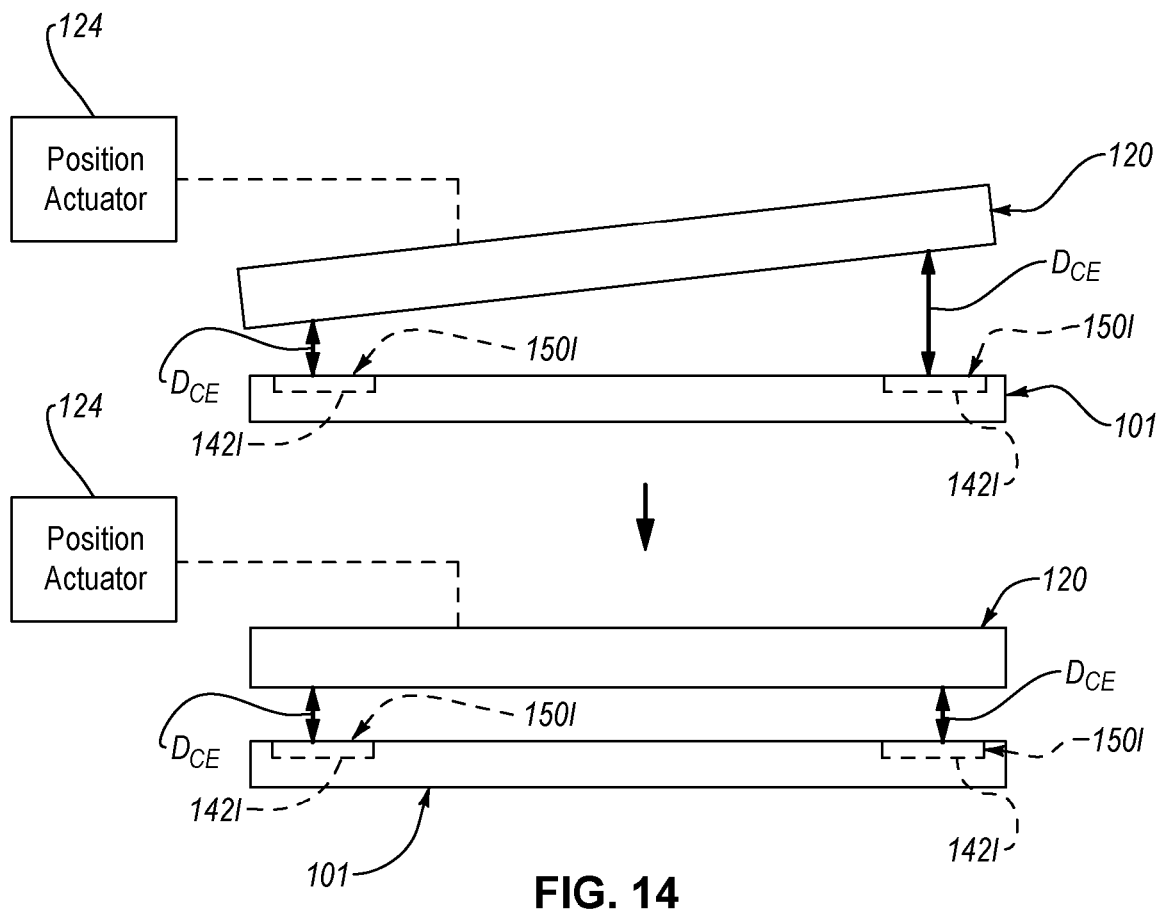
FIG. 14 is a schematic, elevation view of the printhead of FIG. 12A and a cathode of the system of FIG. 1, according to one or more examples of the present disclosure.

As shown in FIGS. 12A-14, in some examples, the capacitance sensors are positioned at the outer periphery of the printhead 101. For example, in FIG. 12A, a second electrically-conductive layer 142I of each one of four capacitive sensors 150I is positioned at a corresponding one of four corners of the printhead 101. Referring to FIGS. 13 and 14, output from each one of the capacitive sensors 150I is utilized by the processor 122 to determine distance $D_{CE}$, at the edges (e.g., corners) of the printhead 101, between the printhead 101 and the cathode 120. Assuming the cathode 120 and the printhead 101 are planar (e.g., unbowed), any differences between the distances $D_{CE}$ indicates one of the cathode 120 or the printhead 101 is tilted or non-parallel relative to the other of the cathode 120 or the printhead 101.

In FIG. 13, the cathode 120 is properly positioned (or at least in a position that will remain fixed) but the distance $D_{CE}$ at one edge of the printhead 101 is greater than the distance $D_{CE}$ at the opposite edge of the printhead 101. Accordingly, in FIG. 13, the printhead 101 is determined to be tilted or off-plane and the position actuator 124 is used to rotate the printhead 101 about an axis until the printhead 101 is parallel with the cathode 120 or the distances $D_{CE}$ at all edges of the printhead 101 are the same. Further adjustments by the position actuator 124 can be made to ensure the distances $D_{CE}$ are at a desired distance (e.g., meet a desired threshold) for material deposition (e.g., whether for depositing an initial layer of material or for depositing each subsequent layer of material).

In FIG. 14, the printhead 101 is properly positioned (or at least in a position that will remain fixed) but the distance $D_{CE}$ at one edge of the printhead 101 is greater than the distance $D_{CE}$ at the opposite edge of the printhead 101. Accordingly, in FIG. 14, the cathode 120 is determined to be tilted or off-plane and the position actuator 124 is used to rotate the cathode 120 about an axis until the cathode 120 is parallel with the printhead or the distances $D_{CE}$ at all edges of the printhead 101 are the same. Further adjustments by the position actuator 124 can be made to ensure the distances $D_{CE}$ are at a desired distance for material deposition (e.g., whether for depositing an initial layer of material or for depositing each subsequent layer of material).

Referring to FIGS. 12B and 12C, a printhead 101, similar to the printhead 101 of FIG. 12A, is shown in conjunction with a cathode 120. The printhead 101 of FIGS. 12B and 12C includes four second electrically-conductive layers 142J-M positioned at a corresponding one of four corners of the printhead 101. The four second electrically-conductive layers 142J-M are electrically isolated from each other, co-planar relative to each other, and at a known distance away from the plane of the deposition anodes 111. The printhead 101 additionally includes a deposition anode array 113 about which the four electrically-conductive layers 142J-M are positioned. The four second electrically-conductive layers 142J-M form part of a corresponding one of four capacitive sensors 150J-M. Each one of the four capacitive sensors 150J-M further includes a first electrically-conductive layer. In the example of FIG. 12B, the four capacitive sensors 150J-M share a common electrically-conductive layer 140, which can be the cathode 120 or a seed layer applied onto the cathode 120. However, in the example of FIG. 12C, the four capacitive sensors 150J-M have a corresponding one of four first electrically-conductive layers 140A-D, which are separate and electrically-isolated from each other and the cathode 120, are co-planar relative to each other, and are at a known distance from the plane of the cathode 120. The four first electrically-conductive layers 140A-D and the cathode 120 are supported on a base 127. The first electrically-conductive layers 140A-D and the second electrically-conductive layers 142J-M are positioned relative to each other such that the first electrically-conductive layer and the second-electrically conductive layer of each one of the four capacitive sensors 150J-M are aligned or overlap with each other. More specifically, the first electrically-conductive layer 140A is aligned with the second electrically-conductive layer 142J, the first electrically-conductive layer 140B is aligned with the second electrically-conductive layer 142K, the first electrically-conductive layer 140C is aligned with the second electrically-conductive layer 142L, and the first electrically-conductive layer 140D is aligned with the second electrically-conductive layer 142M.

Figure 15:
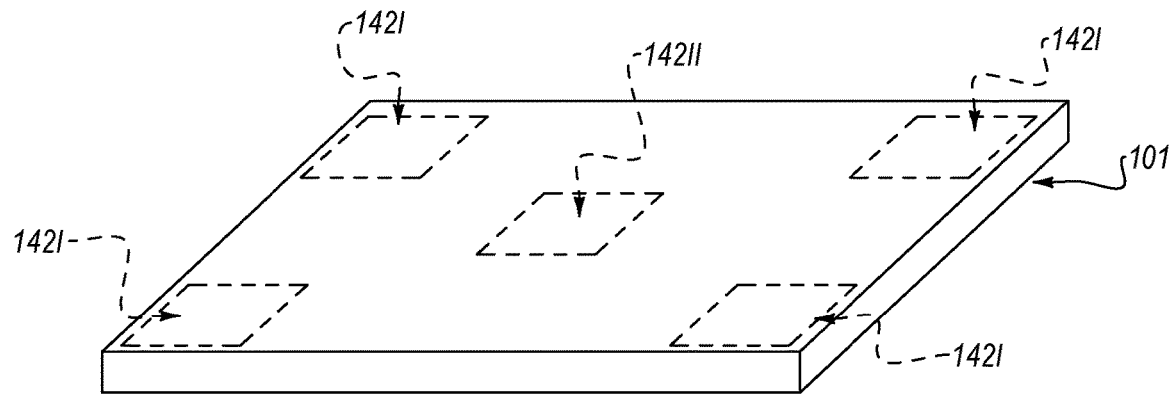
FIG. 15 is a schematic, perspective view of a printhead of the system of FIG. 1, according to one or more examples of the present disclosure.
Figure 16:
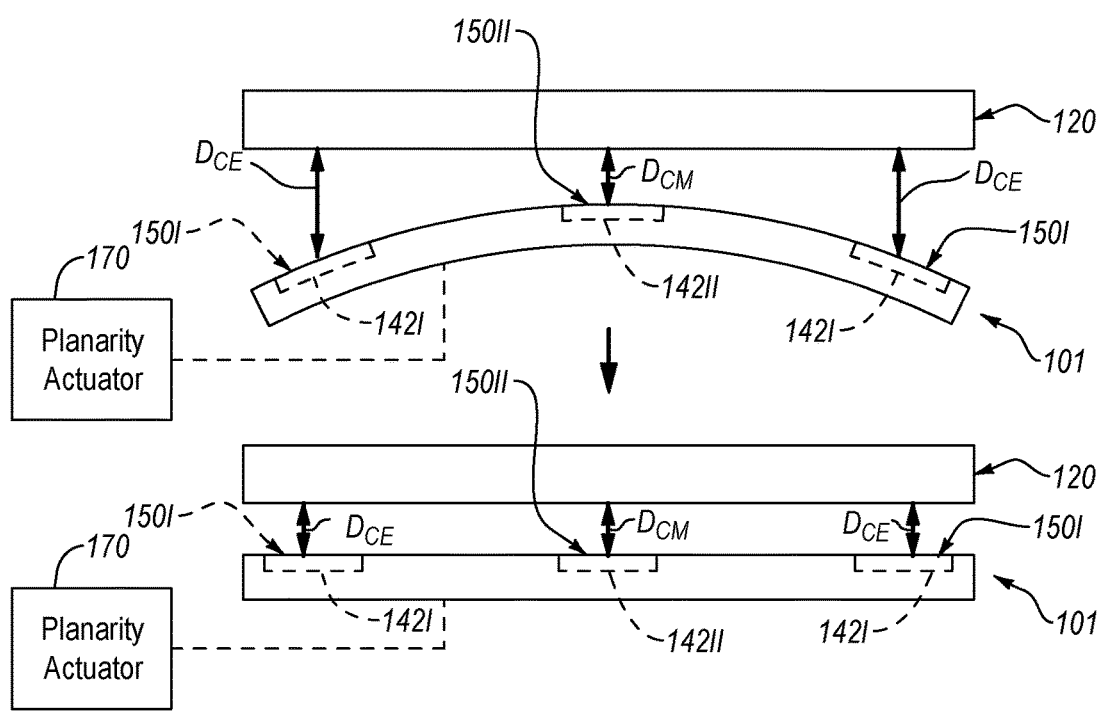
FIG. 16 is a schematic, elevation view of the printhead of FIG. 15 and a cathode of the system of FIG. 1, according to one or more examples of the present disclosure.
Figure 17:
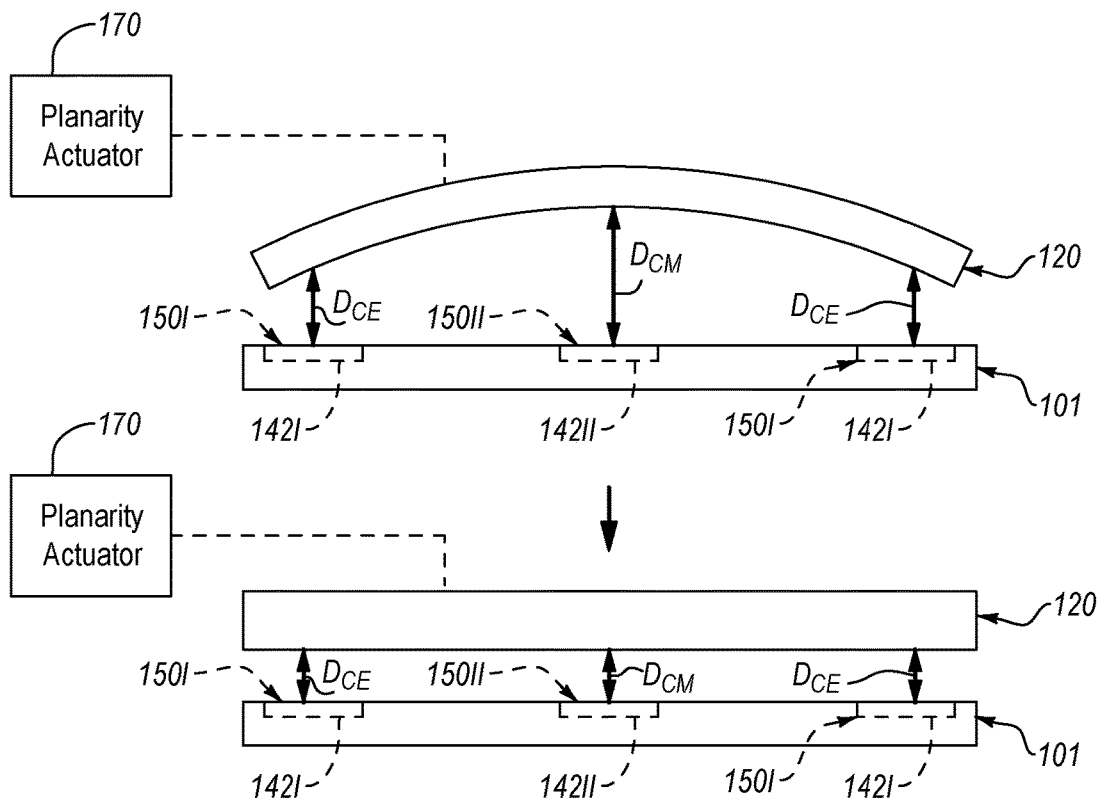
FIG. 17 is a schematic, elevation view of the printhead of FIG. 15 and a cathode of the system of FIG. 1, according to one or more examples of the present disclosure.

As shown in FIGS. 15-17, in some examples, the capacitance sensors are positioned at the outer periphery of the printhead 101 and at a center of the printhead 101. For example, a second electrically-conductive layer 142I of each one of four capacitive sensors 150I is positioned at a corresponding one of four corners of the printhead 101, and a second electrically-conductive layer 142II of a capacitive sensor 150II is positioned at a center of the printhead 101. Referring to FIGS. 16 and 17, output from each one of the capacitive sensors 150I and the capacitive sensor 150II is utilized by the processor 122 to determine distances $D_{CE}$, at the edges of the printhead 101 and a distance $D_{CM}$ at a middle of the printhead 101, between the printhead 101 and the cathode 120. When the distances $D_{CE}$ at the edges of the printhead 101 are the same, but the distance $D_{CM}$ at the middle of the printhead 101 is different than the distances $D_{CE}$, one or both of the cathode 120 or the printhead 101 is determined to be bowed or non-planar.

In FIG. 16, the cathode 120 is considered to be planar or unbowed, the distances $D_{CE}$ at the edges of the printhead 101 are the same, and the distance $D_{CM}$ at the middle of the printhead 101 is different (e.g., less) than the distances $D_{CE}$. Accordingly, in FIG. 16, the printhead 101 is determined to be bowed (e.g., convex). When the distance $D_{CM}$ at the middle of the printhead 101 is more than the distances $D_{CE}$, the printhead 101 is determined to be bowed and concave. Whether having a convex bow or a concave bow, in some examples, the electrochemical deposition system 100 further includes a planarity actuator 170 coupled with the printhead 101 and actuatable to adjust the planarity of the printhead 101. More specifically, the planarity actuator 170 is used to pull, away from the cathode 120, or push, toward the cathode 120, the middle of the printhead 101 until the distance $D_{CM}$ is equal to the distances $D_{CE}$, indicating the printhead 101 is planar and parallel with the cathode 120. Further adjustments by the position actuator 124 can be made to ensure the distances $D_{CE}$ and the distance $D_{CM}$ are at a desired distance for material deposition (e.g., whether for depositing an initial layer of material or for depositing each subsequent layer of material).

In FIG. 17, the printhead 101 is considered to be planar or unbowed, the distances $D_{CE}$ at the edges of the printhead 101 are the same, and the distance $D_{CM}$ at the middle of the printhead 101 is different (e.g., more) than the distances $D_{CE}$. Accordingly, in FIG. 17, the cathode 120 is determined to be bowed (e.g., concave). When the distance $D_{CM}$ at the middle of the printhead 101 is less than the distances $D_{CE}$, the cathode 120 is determined to be bowed and convex. Whether having a concave bow or a convex bow, in some examples, the planarity actuator 170, which can be additionally or alternatively coupled with the cathode 120, is actuatable to adjust the planarity of the cathode 120. More specifically, the planarity actuator 170 is used to push, toward the printhead 101, or pull, away from the printhead 101, the middle of the cathode 120 until the distance $D_{CM}$ is equal to the distances $D_{CE}$, indicating the cathode 120 is planar and parallel with the printhead 101. Further adjustments by the position actuator 124 can be made to ensure the distances $D_{CE}$ and the distance $D_{CM}$ are at a desired distance for material deposition (e.g., whether for depositing an initial layer of material or for depositing each subsequent layer of material).

Figure 18:
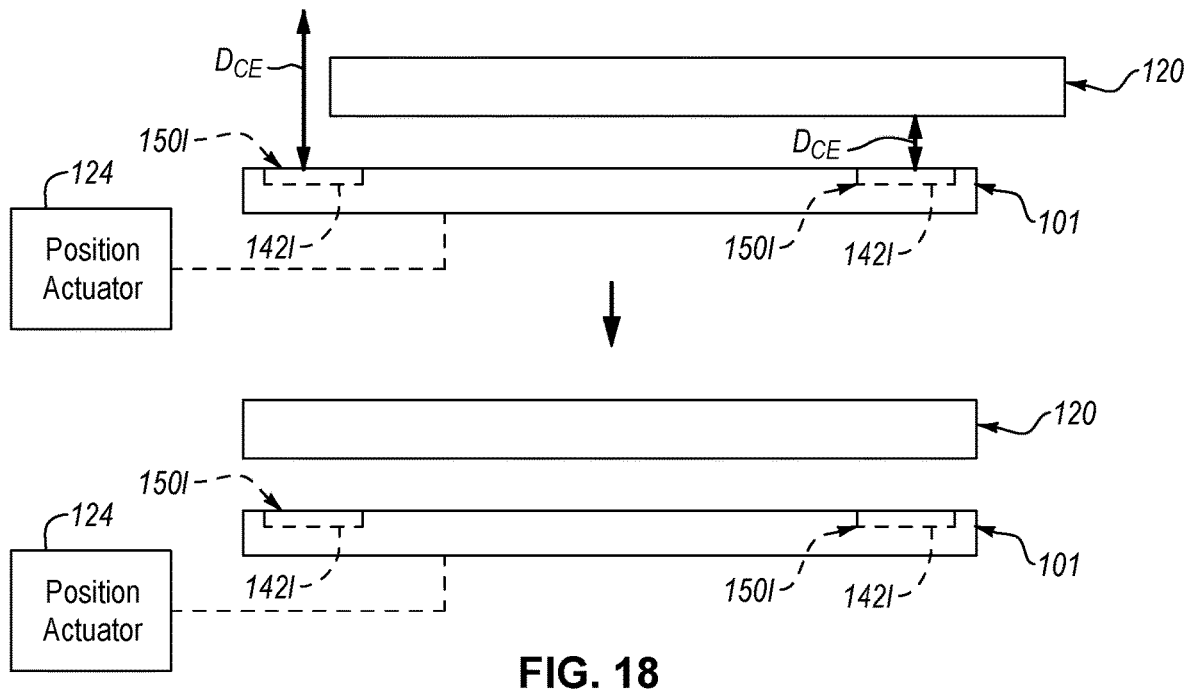
FIG. 18 is a schematic, elevation view of a printhead and a cathode of the system of FIG. 1, according to one or more examples of the present disclosure.

Referring to FIG. 18, in some examples, the capacitance sensors are positioned at the outer periphery of the printhead 101, similar to the arrangement shown in FIG. 12A. Output from each one of the capacitive sensors 150I is utilized by the processor 122 to determine distance $D_{CE}$, at the edges (e.g., corners) of the printhead 101, between the printhead 101 and the cathode 120. When the cathode 120 and the printhead 101 are laterally (e.g., horizontally) misaligned, such as shown, the distance $D_{CE}$ at one or more of the corners of the printhead 101 may be determined to be infinite or unreasonably high, which indicates the first electrically-conductive layer, fixed to the cathode 120, and the second electrically-conductive layer, fixed to the printhead 101 do not entirely overlap because the cathode 120 and the printhead 101 are laterally misaligned. Accordingly, the position actuator 124 is used to laterally move the cathode 120 and/or the printhead 101 until the distances $D_{CE}$ at all edges of the printhead 101 are the same.

The second electrically-conductive layers 142I-II are shown in dashed line to indicate that the second electrically-conductive layers 142I-II can be formed using a single-function metal plate, as described above, or one or more multi-function deposition anodes, as described above. Furthermore, although in some of the examples four capacitance sensors are shown corresponding to positions at the corners of the printhead 101, in other examples, more or less than four capacitance sensors can be used at locations in addition to or other than the corners of the printhead 101.

In view of the foregoing, the electrochemical deposition system 100 includes a feedback control system that includes the processor 122 and the capacitance sensors. The processor 122 utilizes feedback signals from the capacitance sensors to determine orientation, planarity, and position characteristics of the cathode 120 and the printhead 101, and then makes corresponding adjustments to the cathode 120 and/or the printhead 101 in preparation for an initial deposition of a material layer onto the cathode 120 and/or before deposition of each subsequent material layers onto the cathode 120. Accordingly, in some examples, the feedback control system is used once to properly set up (e.g., level or zero out) the orientation, planarity, and positioning of the cathode 120 and the printhead 101 prior to deposition, and then not used during subsequent deposition steps. In other examples, the feedback control system is used at set up and continuously thereafter to make adjustments to the orientation, planarity, and positioning of the cathode 120 and the printhead 101 in real-time as needed.

In certain examples, for calibrating (e.g., setting up or zeroing out) the cathode 120 and the printhead 101, the electrolyte solution 110 is present and acts as the dielectric layer 156 for the capacitance sensors. However, in other examples, a fluidic dielectric is used, instead of the electrolyte solution 110, for calibrating the cathode 120 and the printhead 101. The fluidic dielectric, in some instances, can provide a permittivity that is more conducive to determining capacitance than the electrolyte solution 110. Accordingly, before the electrolyte solution 110 is introduced between the cathode 120 and the printhead 101, a fluidic dielectric is introduced between the cathode 120 and the printhead 101 and the cathode 120 and the printhead 101 are zeroed out. Then, the fluidic dielectric is removed and replaced with the electrolyte solution 110 in preparation for material deposition onto the cathode 120.

The feedback control system can also, or alternatively, be configured to make adjustments to the operation of the electrochemical deposition system 100 other than to the orientation, planarity, and positioning of the cathode 120 and the printhead 101. For example, the feedback from the capacitance sensors may indicate that one of the orientation, planarity, and positioning of the cathode 120 and/or the printhead 101 is off relative to a standard configuration. Rather than adjusting the orientation, planarity, and/or positioning of the cathode 120 and the printhead 101 to meet the standard configuration, in some examples, the processor 122 controls other aspects or processes of the electrochemical deposition system 100, such as material deposition rates, material deposition quantities, firing order of the deposition anodes 111, etc., to compensate for discrepancies between the sensed configuration of the cathode 120 and the printhead 101 and the standard configuration. For example, if bowing is detected, the deposition process could start deposition of material by the deposition anodes 111, proximate the bowing portion of the cathode 120 or printhead 101, earlier if a planar top surface of material is ultimately desired, or end deposition of material early if a non-planar top surface, such as one conforming to the bowed portion of the cathode 120 or printhead 101, is desired.

Figure 20:
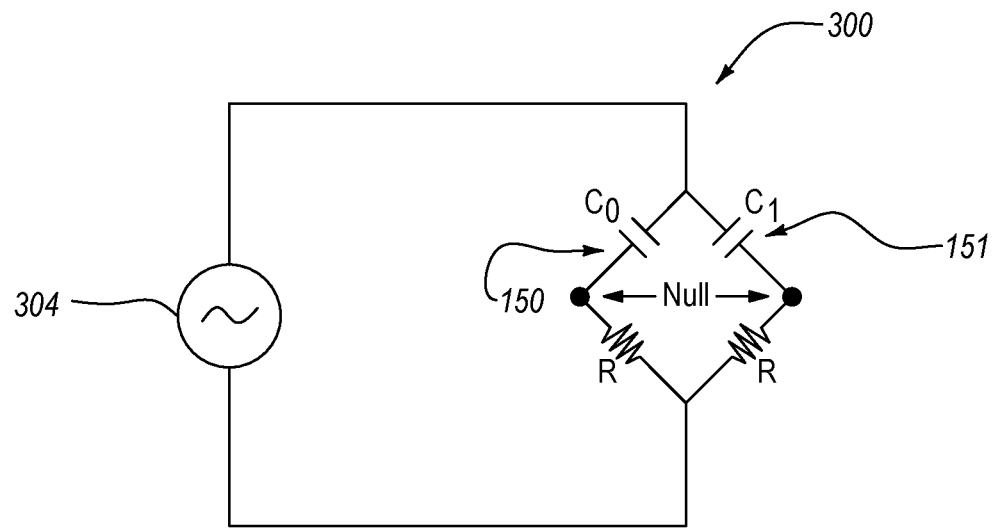
FIG. 20 is a schematic diagram of a bridge circuit, according to one or more examples of the present disclosure.

As presented above, the distance between the first electrically-conductive layer and the second electrically-conductive layer of the capacitive sensors disclosed herein can be determined by knowing the capacitance of the capacitive sensor. Moreover, the capacitance of a capacitive sensor disclosed herein can be measured, and determined, in real time (such that the distance between the first electrically-conductive layer and the second electrically-conductive layer of the capacitor can be determined in real time) in a variety of ways. Referring to FIG. 20, according to one example, a bridge circuit 300 can be used to determine the capacitance $C_0$ of a capacitive sensor 150. The bridge circuit 300 is configured to match the capacitance $C_0$ of the capacitive sensor 150 to a known capacitance $C_1$ of a test capacitor 151. When supplying electrical current to the bridge circuit 300 via a power source 304 and the electrical current flow between one point, between the capacitive sensor 150 and a resistor, and another point, between the test capacitor 151 and an identical resistor, is null, the capacitance $C_0$ of the capacitive sensor 150 is equal to the known capacitance $C_1$ of the test capacitor 151. The bridge circuit 300 can include switches and a number of test capacitors 151 each having a known, but different capacitance $C_1$, such that the capacitance $C_0$ of the capacitive sensor 150 can be separately compared with some or all the test capacitors 151 until a null value is achieved, thus indicating the capacitance $C_0$ of the capacitive sensor 150.

Figure 21:
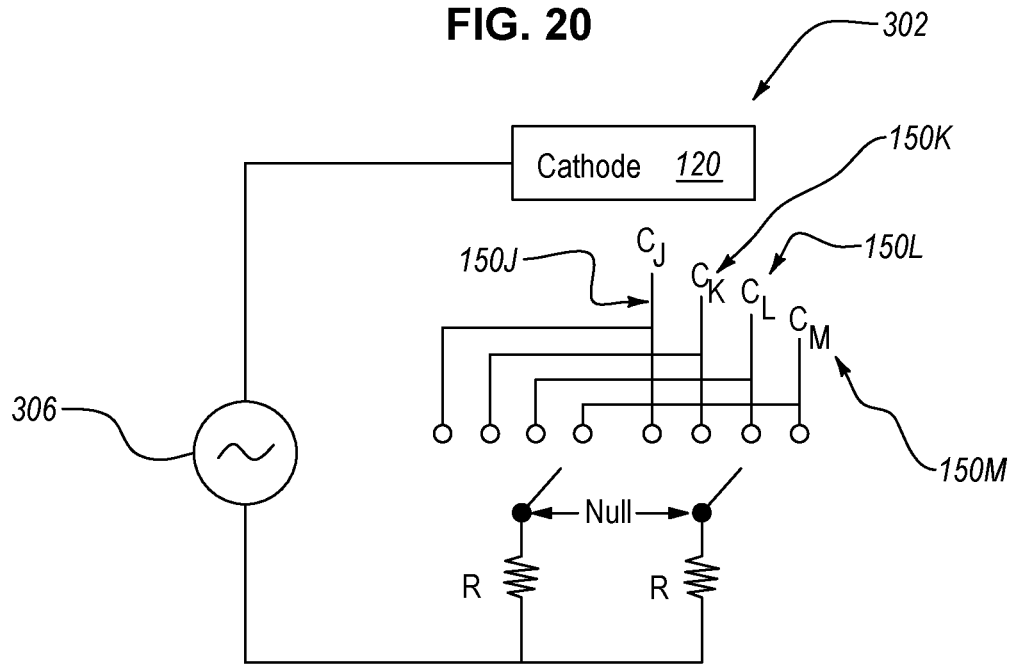
FIG. 21 is a schematic diagram of a switchable bridge circuit, according to one or more examples of the present disclosure.

According to other examples, such as those that have multiple capacitive sensors in the same deposition system, a bridge circuit comparing the capacitance of two or more capacitive sensors can be used to determine when distances between the first electrically-conductive layer and the second electrically-conductive layer of different ones of the capacitive sensors are equal. Accordingly, planarity can be achieved without directly determining the capacitance of the capacitance sensors and the corresponding distances between the first electrically-conductive layer and the second electrically-conductive layer of the capacitance sensors. In one example, as shown in FIG. 21, a switchable bridge circuit 302, powered by a power source 306, includes the four capacitive sensors 150J-M and two switches. The switches are operable to configure the switchable bridge circuit 302 into a bridge circuit that includes two of the four capacitive sensors 150J-M. The current flow between the two paths of the switchable bridge circuit 302, downstream of the resistors and upstream of the capacitive sensors is compared. When this current flow is null, the distance between the two capacitive sensors forming the bridge circuit is the same (e.g., planarity between the cathode 120 and printhead 101, at least at locations corresponding with the two capacitive sensors, is achieved. When the current flow is not null, the relative orientation of the cathode 120 and the printhead 101 can be adjusted, such as via actuators of the deposition system, until the current flow is null. This process can be repeated, by adjusting the switches of the switchable bridge circuit 302, for an alternative two capacitive sensors of the four capacitive sensors to achieve planarity between planarity between the cathode 120 and printhead 101, at least at locations corresponding with the two alternative capacitive sensors. In this manner, equal distances between the cathode 120 and the printhead 101 at all locations of the capacitive sensors can be achieved, thus resulting in an overall planarity of the cathode 120 and the printhead 101.

In FIG. 21, the first electrically-conductive layer of the capacitive sensors 150J-M is indicated as the cathode 120, such that the illustrated example of the switchable bridge circuit 302 corresponds with the printhead 101 and the cathode 120 of FIG. 12B. However, in other examples, the cathode 120 can be replaced with the individual and separate first electrically-conductive layers of the capacitive sensors 150J-M to correspond with the printhead 101 and the cathode 120 of FIG. 12C.

In other examples, the capacitance of a capacitive sensor disclosed herein can be measured, and determined, in real time by utilizing a variable frequency power source and determining the resonant frequency of the variable electrical signal, which corresponds with the capacitance of the capacitive sensor. According to another examples, by utilizing a constant current power source (e.g., DC power source), the decay time of the capacitive sensor can be measured, which corresponds with the capacitance of the capacitive sensor. In yet another example, the frequency of an oscillator, in a circuit with the capacitive sensor and a known resistance, can be measured to determine the capacitance of the capacitive sensor.

Figure 19:
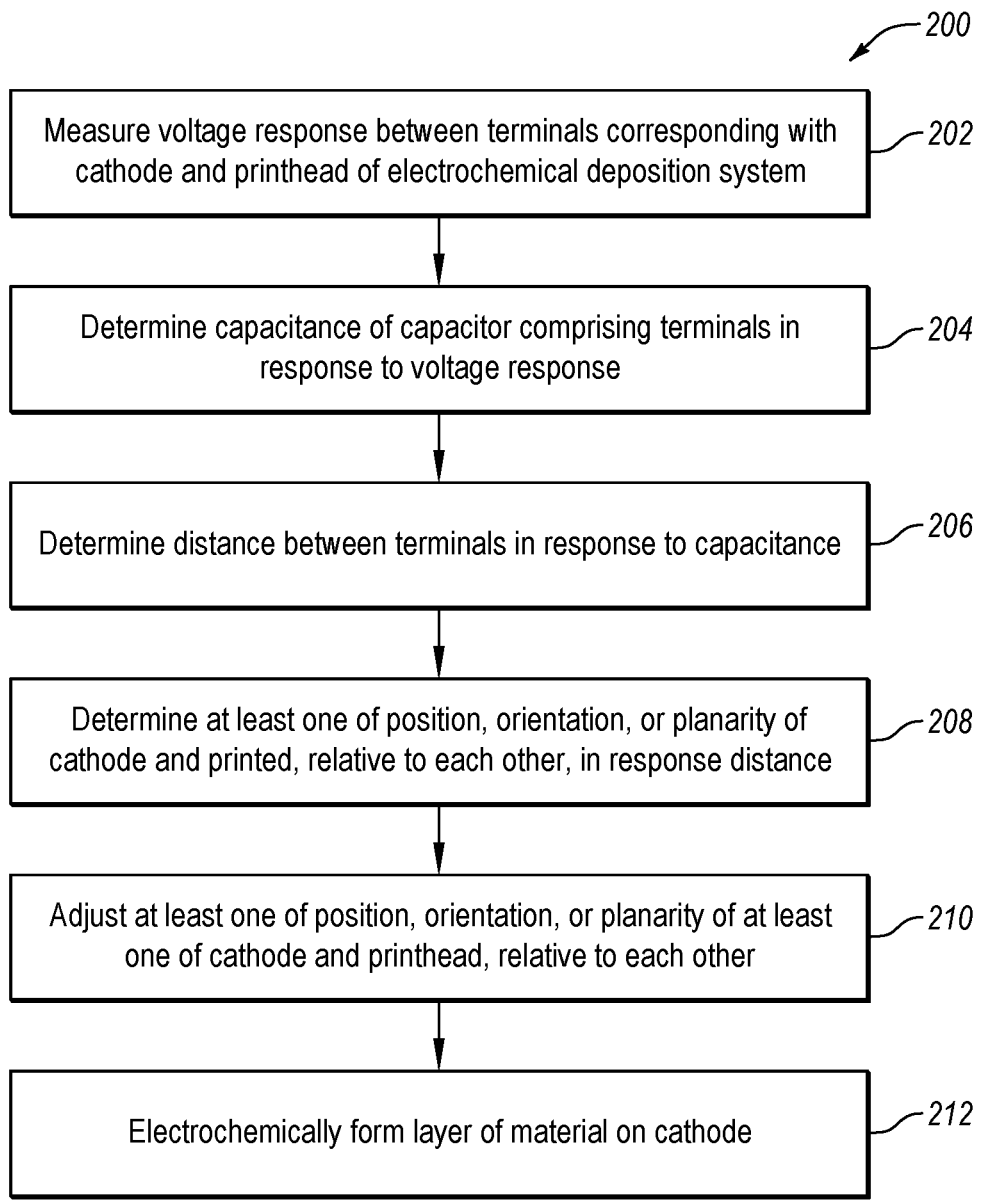
FIG. 19 is a block diagram of a method of manufacturing a part, according to one or more examples of the present disclosure.

According to some examples, as shown in FIG. 19, a method 200 of using the electrochemical deposition system 100 to manufacture a part 130 includes (block 202) measuring a voltage response between the terminals (e.g., the first electrically-conductive layer 140 and the second electrically-conductive layer 142) of one or more capacitance sensors, such as by using one of the techniques presented above for directly or indirectly determining capacitance of a capacitive sensor of the electrochemical deposition system 100. One of the terminals corresponds with the cathode 120 of the electrochemical deposition system 100 and the other one of the terminals corresponds with the printhead 101 of the electrochemical deposition system 100. In some examples, the method 200 additionally includes (block 204) determining the capacitance of the capacitor formed by the terminals of the one or more capacitance sensors in response to the measured voltage response. In certain examples, the method 200 further includes (block 206) determining the distance between the terminals of the one or more capacitance sensors in response to the determined capacitance of the capacitors formed by the terminals. According to some examples, the method 200 also includes (block 208) determining at least one of a position, orientation, or planarity of the cathode 120 relative to the printhead 101 (i.e., at least one of a position, orientation, or planarity of the printhead 101 relative to the cathode 120), in response to the determined distance. The method 200 further includes (block 210) adjusting one of the position, orientation, or planarity of the cathode 120 relative to the printhead 101 in response to the determined position, orientation, and/or planarity of the cathode 120 relative to the printhead 101, in response to a corresponding one of the position, orientation, or planarity of the cathode 120 relative to the printhead 101 being outside a threshold. Alternatively, instead of, or in addition to, making adjustments to the position, orientation, or planarity of the cathode 120 relative to the printhead 101, the method 200 can include making alternative adjustments to the operation of the electrochemical deposition system 100, such as material deposition rates, material deposition quantities, firing order of the deposition anodes 111, etc., in response to the determined position, orientation, and/or planarity of the cathode 120 relative to the printhead 101. Accordingly, after block 208 or after block 210, the method 200 includes (block 212) electrochemically forming a layer of material on the cathode 120.

In some examples, the method 200 does not include the steps of blocks 202-206 and block 208 determines at least one of the position, orientation, or planarity of the cathode 120 relative to the printhead 101 other than in response to the determined distance. As presented above, the capacitance sensor or sensors of the electrochemical deposition system 100 can be utilized to determine at least one of the position, orientation, or planarity of the cathode 120 relative to the printhead 101 without directly determining a capacitance of the capacitance sensor(s) or distance between the terminals of the capacitance sensor(s). For example, a comparison between voltage responses between two different capacitance sensors can be used to determine at least one of the position, orientation, or planarity of the cathode 120 relative to the printhead 101, without directly determining the capacitance of either one of the capacitance sensors.

Other features and steps of the electrochemical deposition system 100 and the method 200, respectively, can be found in U.S. patent application Ser. No. 17/112,909, filed December 2020, which is incorporated herein by reference in its entirety.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of electrochemically forming a part, the method comprising steps of:
   determining a capacitance of a capacitive sensor, comprising:
      a first electrically-conductive layer, at a known location relative to a cathode; and
      a second electrically-conductive layer, at a known location relative to a printhead, which comprises a plurality of deposition anodes;
   determining a distance between the first electrically-conductive layer and the second electrically-conductive layer in response to the capacitance of the capacitive sensor;
   determining at least one of a position, orientation, or planarity of the cathode and the printhead, relative to each other, in response to the distance between the first-electrically-conductive layer and the second electrically-conductive layer;
   adjusting at least one of the position, orientation, or planarity of at least one of the cathode and the printhead, relative to each other, in response to a corresponding one of the position, orientation, or planarity of the cathode relative to the printhead being outside of a threshold;
   electrochemically forming a layer of material onto the cathode;
   at least partially submerging the cathode and the printhead in a fluidic dielectric, wherein the capacitance of the capacitive sensor is determined when the cathode and the printhead are at least partially submerged in the fluidic dielectric; and
   replacing the fluidic dielectric with electrolyte solution such that the cathode and the printhead are at least partially submerged in the electrolyte solution, wherein the layer of material is electrochemically formed onto the cathode when the cathode and the printhead are submerged in the electrolyte solution.

2. The method according to claim 1, further comprising a step of measuring a voltage response between the first electrically-conductive layer and the second electrically-conductive layer, wherein the capacitance of the capacitance sensor is determined in response to the voltage response measured between the first electrically-conductive layer and the second electrically-conductive layer.

3. The method according to claim 1, wherein:
   the step of determining the capacitance of the capacitive sensor comprises determining the capacitance of a plurality of capacitive sensors where the second electrically-conductive layers of the plurality of capacitive sensors are located around a periphery of the printhead; and
   the step of adjusting at least one of the position, orientation, or planarity of at least one of the cathode and the printhead, relative to each other, comprises adjusting a tilt of at least one of the cathode and the printhead, relative to each other.

4. The method according to claim 1, wherein:
   the second electrically-conductive layer of the capacitive sensor is located at a center of the printhead; and
   the step of adjusting at least one of the position, orientation, or planarity of at least one of the cathode and the printhead, relative to each other, comprises adjusting a bow of at least one of the cathode and the printhead, relative to each other.

5. The method according to claim 1, wherein:
   the step of determining the capacitance of the capacitive sensor comprises determining the capacitance of a plurality of capacitive sensors where the second electrically-conductive layers of the plurality of capacitive sensors are located around a periphery of the printhead; and
   the step of adjusting at least one of the position, orientation, or planarity of at least one of the cathode and the printhead, relative to each other, comprises adjusting a lateral position of at least one of the cathode and the printhead, relative to each other.

6. The method according to claim 1, wherein:
   the step of determining the capacitance of the capacitive sensor comprises determining the capacitance of a plurality of capacitive sensors where the second electrically-conductive layers of some of the plurality of capacitive sensors are located around a periphery of the printhead and where the second electrically-conductive layer of the capacitive sensor is located at a center of the printhead; and
   the step of adjusting at least one of the position, orientation, or planarity of at least one of the cathode and the printhead, relative to each other, comprises adjusting a tilt of at least one of the cathode and the printhead, relative to each other, and adjusting a bow of at least one of the cathode and the printhead, relative to each other.

7. The method according to claim 1, wherein:
the printhead is spaced apart from the cathode and movable relative to the cathode; and
adjusting the at least one of the position, orientation, or planarity of at least one of the cathode and the printhead, relative to each other, comprises moving the printhead and the cathode relative to each other.

8. The method according to claim 1, wherein:
the cathode comprises a seed layer and the first electrically-conductive layer of the capacitive sensor comprises the seed layer; and
determining the distance comprises determining a distance between the seed layer and the second electrically-conductive layer.

9. The method according to claim 8, wherein:
the printhead comprises a plurality of deposition anodes and a metal layer separate from the plurality of deposition anodes;
the second electrically-conductive layer of the capacitive sensor comprises the metal layer of the printhead; and
determining the distance comprises determining a distance between the seed layer and metal layer.

10. The method according to claim 1, wherein:
determining the capacitance of the capacitive sensor comprises determining the capacitance of a plurality of capacitive sensors;
each one of the plurality of capacitive sensors comprises the first electrically-conductive layer and a corresponding one of a plurality of second electrically-conductive layers;
the second electrically-conductive layer of each one of the plurality of capacitive sensors is spaced apart from the second electrically-conductive layer of any other one of the plurality of capacitive sensors;
determining the distance between the first electrically-conductive layer and the second electrically-conductive layer comprises determining the distance between the first electrically-conductive layer and the second electrically-conductive layer of each one of the plurality of capacitive sensors; and
determining the at least one of a position, orientation, or planarity of the cathode and the printhead, relative to each other, is based on the distance between the first electrically-conductive layer and the second electrically-conductive layer of each one of the plurality of capacitive sensors.

11. The method according to claim 10, wherein:
the second electrically-conductive layer of at least one of the plurality of capacitive sensors comprises a metal layer separate from the plurality of deposition anodes; and
the second electrically-conductive layer of at least one of the plurality of capacitive sensors comprises at least one of the plurality of deposition anodes.

12. The method according to claim 1, wherein at least one of:
the first electrically-conductive layer is fixed to the cathode such that the first electrically-conductive layer co-moves with the cathode; or
the second electrically-conductive layer is fixed to the printhead such that the second electrically-conductive layer co-moves with the printhead.

13. A method of electrochemically forming a part, the method comprising steps of:
determining a capacitance of a capacitive sensor, comprising:
a first electrically-conductive layer, at a known location relative to a cathode; and
a second electrically-conductive layer, at a known location relative to a printhead, which comprises a plurality of deposition anodes;
determining a distance between the first electrically-conductive layer and the second electrically-conductive layer in response to the capacitance of the capacitive sensor;
determining at least one of a position, orientation, or planarity of the cathode and the printhead, relative to each other, in response to the distance between the first-electrically-conductive layer and the second electrically-conductive layer;
adjusting at least one of the position, orientation, or planarity of at least one of the cathode and the printhead, relative to each other, in response to a corresponding one of the position, orientation, or planarity of the cathode relative to the printhead being outside of a threshold; and
electrochemically forming a layer of material onto the cathode;
wherein:
the cathode comprises a seed layer and the first electrically-conductive layer of the capacitive sensor comprises the seed layer;
determining the distance comprises determining a distance between the seed layer and the second electrically-conductive layer;
the printhead comprises a plurality of deposition anodes and a metal layer separate from the plurality of deposition anodes;
the second electrically-conductive layer of the capacitive sensor comprises the metal layer of the printhead;
determining the distance comprises determining a distance between the seed layer and metal layer;
the printhead further comprises an insulation layer; and
the metal layer is embedded within the printhead such that the insulation layer is interposed between the metal layer and the plurality of deposition anodes.

14. The method according to claim 13, wherein:
the second electrically-conductive layer of the capacitive sensor comprises at least one of the plurality of deposition anodes; and
determining the distance comprises determining a distance between the seed layer and the at least one of the plurality of deposition anodes.

15. The method according to claim 14, wherein:
the second electrically-conductive layer of the capacitive sensor comprises at least two deposition anodes of the plurality of deposition anodes; and
determining the distance comprises determining a distance between the seed layer and the at least two of the plurality of deposition anodes.

16. A method of electrochemically forming a part, the method comprising steps of:
determining a capacitance of a capacitive sensor, comprising:
a first electrically-conductive layer, at a known location relative to a cathode; and a second electrically-conductive layer, at a known location relative to a printhead, which comprises a plurality of deposition anodes;

determining a distance between the first electrically-conductive layer and the second electrically-conductive layer in response to the capacitance of the capacitive sensor;

determining at least one of a position, orientation, or planarity of the cathode and the printhead, relative to each other, in response to the distance between the first-electrically-conductive layer and the second electrically-conductive layer;

adjusting at least one of the position, orientation, or planarity of at least one of the cathode and the printhead, relative to each other, in response to a corresponding one of the position, orientation, or planarity of the cathode relative to the printhead being outside of a threshold; and electrochemically forming a layer of material onto the cathode;

wherein:

determining the capacitance of the capacitive sensor comprises determining the capacitance of a plurality of capacitive sensors;

each one of the plurality of capacitive sensors comprises the first electrically-conductive layer and a corresponding one of a plurality of second electrically-conductive layers;

the second electrically-conductive layer of each one of the plurality of capacitive sensors is spaced apart from the second electrically-conductive layer of any other one of the plurality of capacitive sensors;

determining the distance between the first electrically-conductive layer and the second electrically-conductive layer comprises determining the distance between the first electrically-conductive layer and the second electrically-conductive layer of each one of the plurality of capacitive sensors;

determining the at least one of a position, orientation, or planarity of the cathode and the printhead, relative to each other, is based on the distance between the first electrically-conductive layer and the second electrically-conductive layer of each one of the plurality of capacitive sensors;

the second electrically-conductive layer of at least one of the plurality of capacitive sensors comprises a metal layer separate from the plurality of deposition anodes;

the second electrically-conductive layer of at least one of the plurality of capacitive sensors comprises at least one of the plurality of deposition anodes; and the plurality of deposition anodes surround the metal layer such that no deposition anodes of the plurality of deposition anodes is interposed between the metal layer and the first electrically-conductive layer.

17. The method according to claim 16, wherein:
the printhead comprises an outer peripheral edge; and
at least some of the plurality of second electrically-conductive layers are spaced apart along the outer peripheral edge of the printhead.

18. The method according to claim 17, wherein:
the outer peripheral edge of the printhead defines at least three corners of the printhead; and
each one of the at least some of the plurality of second electrically-conductive layers is located proximate a corresponding one of the four corners of the printhead.

19. The method according to claim 18, wherein one of the plurality of second electrically-conductive layers is located at a center of the printhead.

20. The method according to claim 16, wherein the second electrically-conductive layer of each one of at least two of the plurality of capacitive sensors comprises a corresponding one of at least two groupings of the plurality of deposition anodes.

21. The method according to claim 16, wherein at least one of:
the first electrically-conductive layer is fixed to the cathode such that the first electrically-conductive layer co-moves with the cathode; or
the second electrically-conductive layer is fixed to the printhead such that the second electrically-conductive layer co-moves with the printhead.

* * * * *